US009588332B2

(12) United States Patent
Kobayashi et al.

(10) Patent No.: US 9,588,332 B2
(45) Date of Patent: Mar. 7, 2017

(54) PHOTOGRAPHY SYSTEM

(71) Applicant: OLYMPUS CORPORATION, Tokyo (JP)

(72) Inventors: Eiichi Kobayashi, Tokyo (JP); Fumio Hori, Tokyo (JP); Yutaka Konomura, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 371 days.

(21) Appl. No.: 14/200,861

(22) Filed: Mar. 7, 2014

(65) Prior Publication Data

US 2014/0267678 A1 Sep. 18, 2014

Related U.S. Application Data

(60) Provisional application No. 61/780,570, filed on Mar. 13, 2013.

(51) Int. Cl.
*H04N 3/36* (2006.01)
*H04N 7/18* (2006.01)
(Continued)

(52) U.S. Cl.
CPC ..... *G02B 23/2484* (2013.01); *G02B 23/2476* (2013.01); *H04N 7/183* (2013.01); *F01D 21/003* (2013.01)

(58) Field of Classification Search
None
See application file for complete search history.

(56) References Cited

U.S. PATENT DOCUMENTS 6,063,023 A * 5/2000 Sakiyama .......... A61B 1/00193 600/117
2005/0199832 A1 9/2005 Twerdochlib
(Continued)

FOREIGN PATENT DOCUMENTS

EP 2 284 797 A1 2/2011

OTHER PUBLICATIONS

Extended European Search Report dated Oct. 7, 2014 from related European Application No. EP 14 15 8609.9.
(Continued)

*Primary Examiner* — Jorge L Ortiz Criado
*Assistant Examiner* — Samuel D Fereja
(74) *Attorney, Agent, or Firm* — Scully, Scott, Murphy & Presser, P.C.

(57) ABSTRACT

A photography system includes an observation scope inserted into a hole of a case in which a plurality of subjects, which are cyclically disposed around a rotary shaft and rotate around the rotary shaft, are housed along with the rotary shaft and the hole is formed to penetrate through the case, the observation scope being configured to sequentially acquire light from the plurality of subjects. The photograph system includes an imaging section configured to generate an image by continuously imaging light acquired by the observation scope; a sensor configured to continuously detect states of the plurality of subjects which rotate and sequentially output detection values; and an image acquisition section configured to detect a position of the subject based on cyclic variation of the detection value and acquire the image including the subject at the detected position which is a predetermined position.

21 Claims, 29 Drawing Sheets

(51) Int. Cl.

| | |
|---|---|
| ***G02B 23/24*** | (2006.01) |
| *F01D 21/00* | (2006.01) |

(56) References Cited

U.S. PATENT DOCUMENTS

| | | | | |
|---|---|---|---|---|
| 2006/0078193 | A1 | 4/2006 | Brummel et al. | |
| 2006/0178558 | A1 | 8/2006 | Obata | |
| 2007/0132840 | A1 | 6/2007 | Konomura | |
| 2007/0263406 | A1 * | 11/2007 | Negishi | A61B 1/0669 362/574 |
| 2008/0158556 | A1 * | 7/2008 | Bendall | F01D 5/005 356/241.1 |
| 2009/0092278 | A1 * | 4/2009 | Doi | A61B 1/00022 382/100 |
| 2009/0201364 | A1 * | 8/2009 | Konomura | G01N 21/954 348/65 |
| 2011/0013846 | A1 * | 1/2011 | Hori | G06T 7/001 382/218 |
| 2011/0025844 | A1 | 2/2011 | Hori | |
| 2012/0107780 | A1 | 5/2012 | Motoki | |
| 2013/0135457 | A1 * | 5/2013 | Kell | F01D 25/285 348/82 |

OTHER PUBLICATIONS

European Search Report dated Jun. 17, 2014 from related European Application No. 14 15 8609.9.

* cited by examiner

PHOTOGRAPHY SYSTEM

Priority is claimed on U.S. Provisional Patent Application No. 61/780,570, filed Mar. 13, 2013, the content of which is incorporated herein by reference.

BACKGROUND OF THE INVENTION

Field of the Invention

The present invention relates to technology for imaging a plurality of subjects which are cyclically disposed around a rotary shaft and rotate around the rotary shaft.

Description of the Related Art

In the related art, blades within a jet engine, etc. are observed using an observation scope of an endoscope, etc. Using an image of a subject (an object to be tested) acquired using the observation scope, for example, it is possible to determine the presence/absence of a defect on the subject or measure a size of the defect.

SUMMARY

According to a first aspect of the present invention, a photography system includes: an observation scope inserted into a hole of a case in which a plurality of subjects, which are cyclically disposed around a rotary shaft and rotate around the rotary shaft, are housed along with the rotary shaft and the hole is formed to penetrate through the case, the observation scope being configured to sequentially acquire light from the plurality of subjects; an imaging section configured to generate an image by continuously imaging light acquired by the observation scope; a sensor configured to continuously detect states of the plurality of subjects which rotate and sequentially output detection values; and an image acquisition section configured to detect a position of the subject based on cyclic variation of the detection value and acquire the image including the subject at the detected position which is a predetermined position.

According to a second aspect of the present invention, in the photography system according to the first aspect, the image acquisition section may detect a cycle in which the rotary shaft rotates based on the cyclic variation of the detection value and detect a position corresponding to a time by associating the time based on the cycle with variation of the position of the subject.

According to a third aspect of the present invention, in the photography system according to the first aspect, the image acquisition section may detect a cycle in which the rotary shaft rotates based on the cyclic variation of the detection value and detect a position corresponding to the detection value by associating the variation of the detection value within the cycle with variation of the position of the subject.

According to a fourth aspect of the present invention, in the photography system according to the first aspect, the sensor may be an image sensor which continuously images the subject and sequentially outputs images.

According to a fifth aspect of the present invention, in the photography system according to the fourth aspect, the image acquisition section may detect an edge from the image output from the image sensor and detect the position of the subject based on cyclic variation of the detected edge position.

According to a sixth aspect of the present invention, in the photography system according to the fourth aspect, the image acquisition section may detect the position of the subject based on cyclic variations of pixel values in a plurality of pixels of an image output from the image sensor.

According to a seventh aspect of the present invention, in the photography system according to the fourth aspect, the image acquisition section may detect the position of the subject based on cyclic variations of a pixel value in a first pixel of the image output by the image sensor and a pixel value in a second pixel of the image output by the image sensor.

According to an eighth aspect of the present invention, in the photography system according to the second aspect, the image acquisition section may detect a cycle in which the rotary shaft rotates by calculating a time in which the states of the subjects equal in number to the number of subjects disposed around the rotary shaft are detected by the sensor based on cyclic variations of the detection values.

According to a ninth aspect of the present invention, in the photography system according to the eighth aspect, a plurality of sets of subject groups, each of which includes a plurality of subjects that are cyclically disposed around a rotary shaft and rotate around the rotary shaft, may be housed along with the rotary shaft and a plurality of holes are formed in the case to penetrate through the case, a plurality of observation scopes including first and second observation scopes which sequentially acquire light from the plurality of subjects included in the one set of subject groups among the plurality of sets of subject groups may be inserted into the plurality of holes, a plurality of sensors including a first sensor configured to detect the states of the plurality of subjects from which the first observation scope acquires light and a second sensor configured to detect the states of the plurality of subjects from which the second observation scope acquires light may be provided, and the image acquisition section may: detect a first cycle which is a cycle of variation of the detection value output by the first sensor, detect a second cycle which is a cycle of variation of the detection value output by the second sensor, and calculate the number of subjects disposed around the rotary shaft based on a ratio between the first cycle and the second cycle.

According to a tenth aspect of the present invention, in the photography system according to the eighth aspect, the image acquisition section may calculate the number of subjects disposed around the rotary shaft based on an autocorrelation of a signal stream including the detection value output by the sensor in a predetermined period.

According to an eleventh aspect of the present invention, the photography system according to the first aspect may include a plurality of sensors, wherein the image acquisition section detects the position of the subject based on cyclic variations of detection values output by the plurality of sensors.

According to a twelfth aspect of the present invention, in the photography system according to the first aspect, the imaging section may perform imaging at an indicated timing, and the image acquisition section may instruct the imaging section to perform the imaging at a timing at which the position of the subject becomes a predetermined position and acquires an image generated by the imaging section.

According to a thirteenth aspect of the present invention, in the photography system according to the first aspect, the imaging section may generate a plurality of images by performing imaging a plurality of times, and the image acquisition section may acquire an image generated by the imaging section at a timing at which the position of the subject becomes a predetermined position among the plurality of images.

According to a fourteenth aspect of the present invention, in the photography system according to the first aspect, the sensor may be a distance sensor which detects distances to the subjects and sequentially outputs the detection values.

According to a fifteenth aspect of the present invention, in the photography system according to the first aspect, the sensor may be a light amount sensor which detects amounts of light reflected by the subjects after the light is radiated to the subjects and sequentially outputs the detection values.

DETAILED DESCRIPTION OF THE PREFERRED EMBODIMENTS

Hereinafter, embodiments of the present invention will be described with reference to the drawings.

First Embodiment

Figure 1:
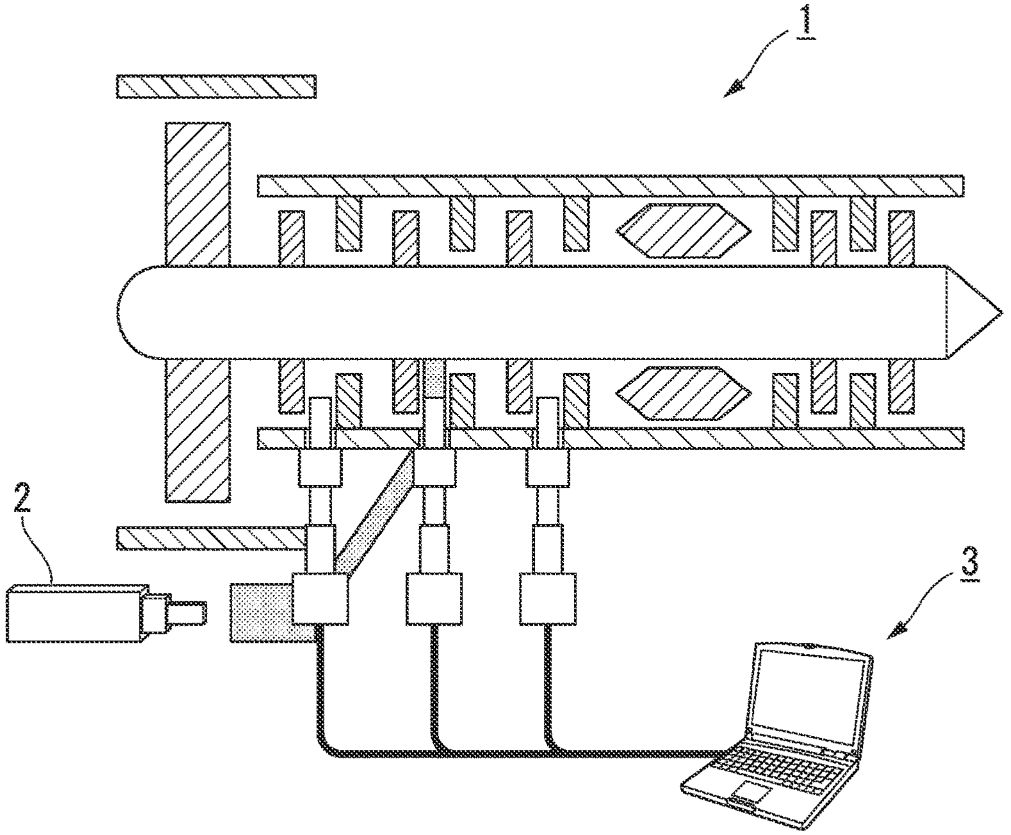
FIG. 1 is a diagram illustrating a configuration of a blade observation system according to a first embodiment of the present invention.

First, the first embodiment of the present invention will be described. FIG. 1 illustrates a configuration of a blade observation system according to this embodiment. As illustrated in FIG. 1, the blade observation system has a jet engine 1, a turning tool 2, and a photography system 3. The jet engine 1 has a plate-like blade which is a subject to be photographed (an object to be tested). The turning tool 2 causes blades within the jet engine 1 to rotate. The photography system 3 photographs the blades to generate an image.

Figure 2:
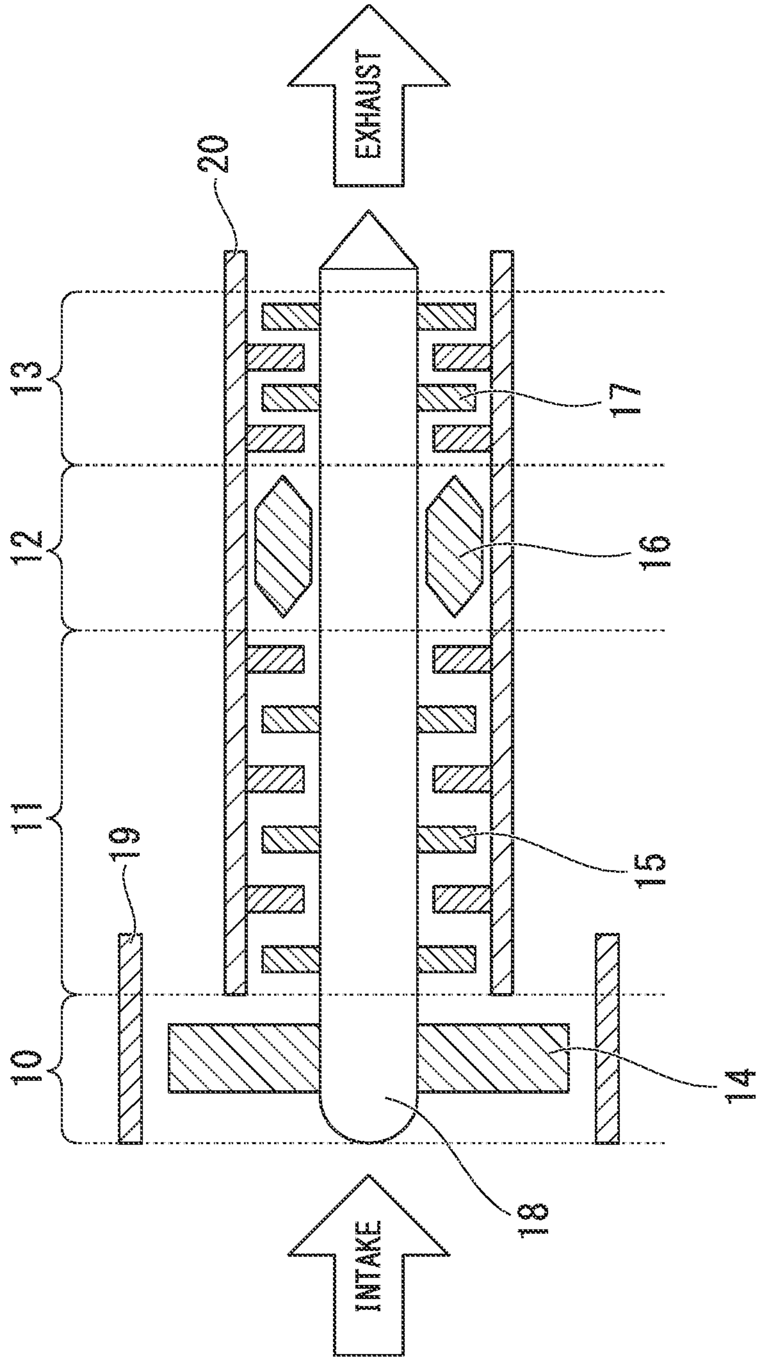
FIG. 2 is a diagram illustrating a cross-sectional structure of a jet engine in the first embodiment of the present invention.

FIG. 2 illustrates a cross-sectional structure of the jet engine 1. The jet engine 1 is a cylindrical structure, and is divided into an intake section 10, a compressor section 11, a combustion section 12, and an exhaust section 13 from an intake side (the left of FIG. 2) to an exhaust side (the right of FIG. 2). In the intake section 10, a fan blade 14 rotates to suction the air from outside to the inside of the jet engine 1. In the compressor section 11, compressor blades 15 rotate and the suctioned air is compressed. In the combustion section 12, the compressed air is combusted by a fuel introduced into a combustion tube 16. In the exhaust section 13, turbine blades 17 rotate and therefore the combusted air is exhausted to the outside.

The fan blades 14, the compressor blades 15, and the turbine blades 17 are disposed around the same rotary shaft 18 which is on the center of the jet engine 1 and rotates around the rotary shaft 18. The fan blades 14, the compressor blades 15, the combustion tubes 16, the turbine blades 17, and the rotary shaft 18 are housed in casings 19 and 20 which are housing containers (cases).

Figure 3A:
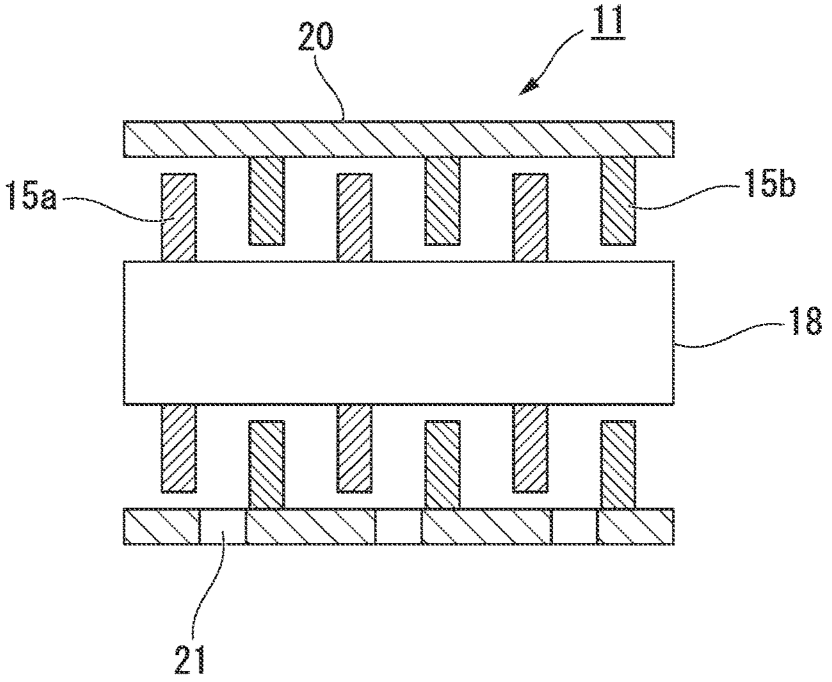
FIG. 3A is a diagram illustrating a cross-sectional structure of a compressor section in the first embodiment of the present invention.
Figure 3B:
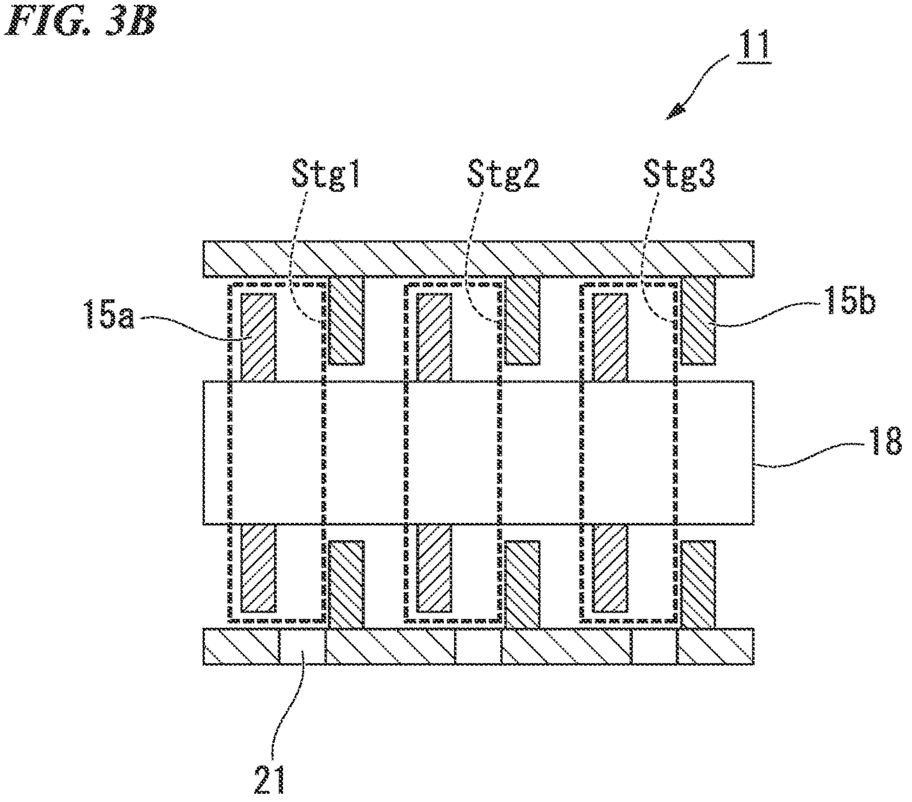
FIG. 3B is a diagram illustrating a cross-sectional structure of the compressor section in the first embodiment of the present invention.

Each of FIGS. 3A and 3B illustrates a cross-sectional structure of the compressor section 11. There are two types of the compressor blades 15, including a rotor 15*a* and a stator 15*b*. The rotor 15*a* is a blade which is cyclically disposed around the rotary shaft 18 and rotates according to rotation of the rotary shaft 18. The stator 15*b* is fixed to the casing 20 and is a stationary blade. In this embodiment, the rotor 15*a* is a subject to be photographed and the stator 15*b* is not a subject to be photographed. Hereinafter, the rotor 15*a* is merely described as the blade.

In the compressor section 11, a hole called an access port 21 penetrating through the casing 20 is opened in the casing 20. As will be described later, an observation borescope can be inserted from the outside into the access port 21 and an internal state of the jet engine 1 can be observed.

In the compressor section 11, a plurality of sets of blade groups are disposed at different positions of a shaft direction of the rotary shaft 18, wherein one set of blade groups (subject groups) includes a plurality of blades (rotors 15*a*) for one round cyclically disposed in a circumferential direction of the rotary shaft 18. In this embodiment, a range in which one set of blade groups is disposed is referred to as a stage. As illustrated in FIG. 3B, three stages Stg1, Stg2, and Stg3 are provided, and the stages are demarcated by the stators 15*b*. One access port 21 is provided for each stage. Light from the blades of each stage is acquired by the borescope inserted into the access port 21 corresponding to each stage. Although three stages are provided on the compressor section 11 of this embodiment, it is only necessary for the number of stages to be two or more.

Figure 4:
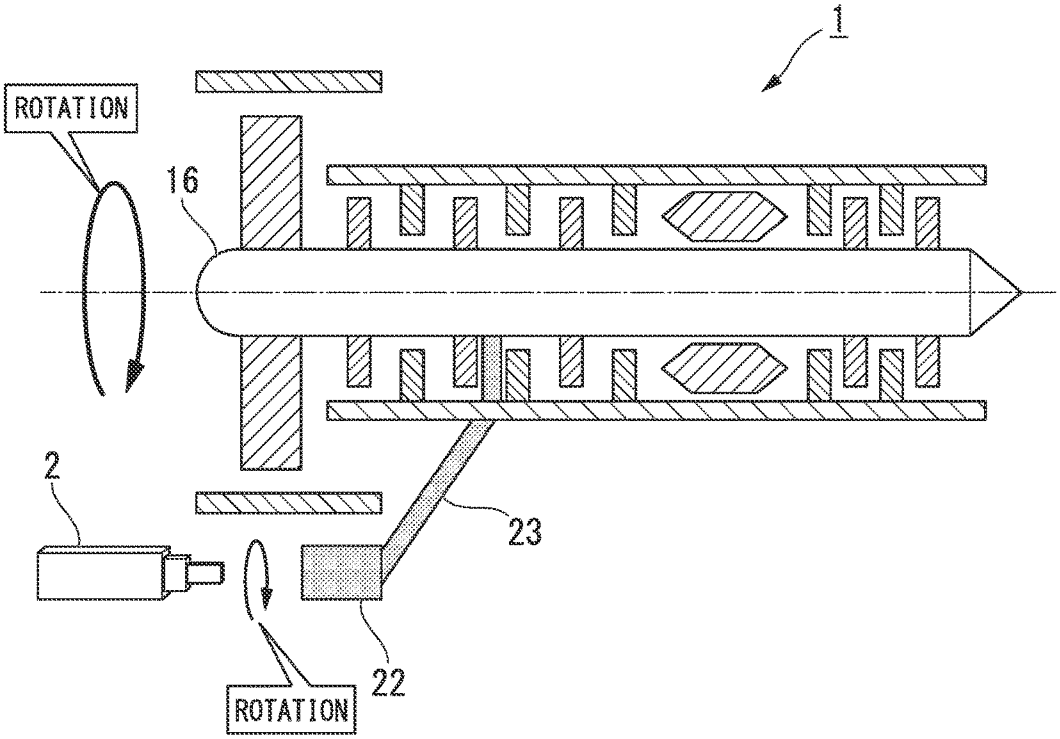
FIG. 4 is a diagram illustrating a configuration in which a rotary shaft of the jet engine rotates in the first embodiment of the present invention.

FIG. 4 illustrates a configuration in which the rotary shaft 18 is caused to rotate. Under the jet engine 1, a gear box 22 which is a mechanism for transferring a rotating force to the rotary shaft 18 is attached. When the blades are caused to rotate, the turning tool 2 is connected to the gear box 22 and the turning tool 2 rotates, so that the generated rotating force is applied to the gear box 22. The gear box 22 is connected to a shaft 23, the rotating force applied to the gear box 22 is applied to the rotary shaft 18 via the shaft 23, and the rotary shaft 18 rotates, so that the blades rotate.

Figure 5:
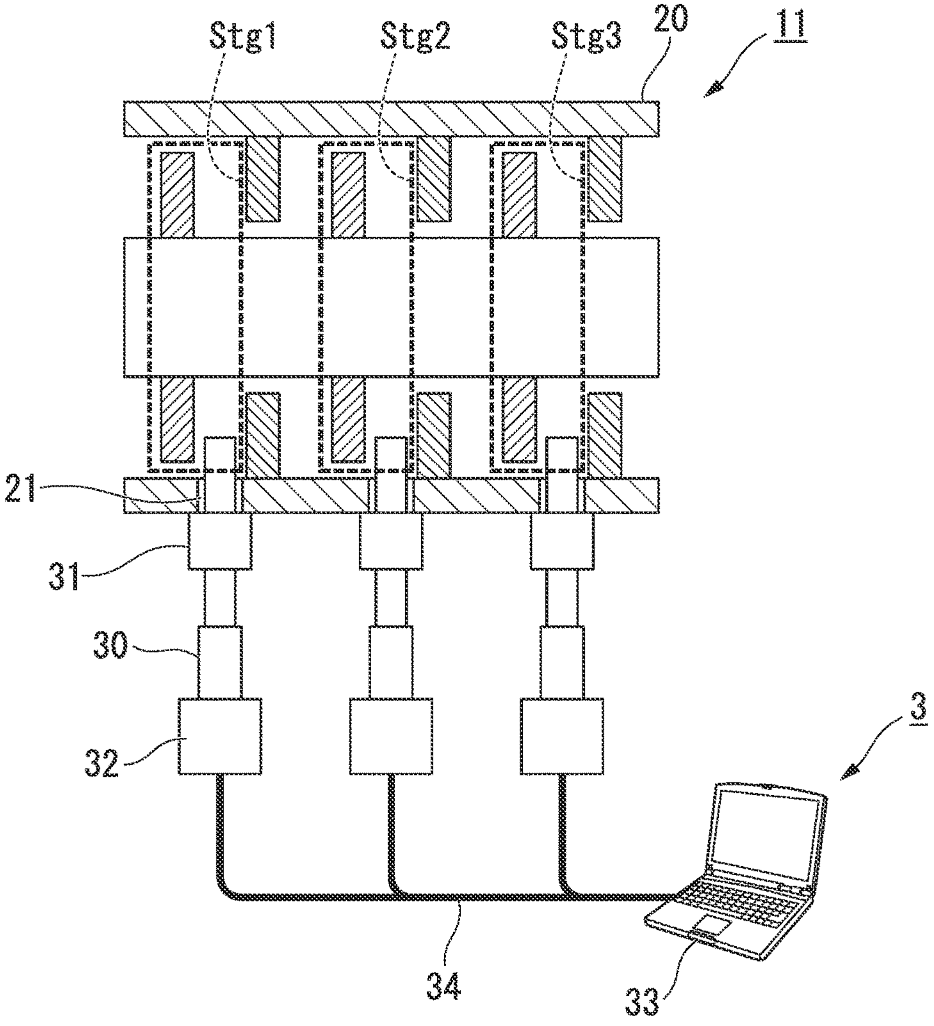
FIG. 5 is a diagram illustrating a configuration of a photography system in the first embodiment of the present invention.

FIG. 5 illustrates a configuration of the photography system 3. The photography system 3 is a system for efficiently photographing blades which are a subject, and is an example of a photography system which is an aspect of the present invention. The photography system 3 has borescopes 30, fixing tools 31, cameras 32, a PC 33, and a communication cable 34.

Three borescopes 30 and three fixing tools 31 are provided to be equal in number to the three stages Stg1, Stg2, and Stg3. The borescope 30 sequentially acquires light from a plurality of blades disposed on one stage. The borescope 30 is inserted from the access port 21 to the inside of the jet engine 1 (the inside of the casing 20). The borescope 30 is inserted to be approximately perpendicular to the surface of the casing 20. The borescope 30 is an example of the observation scope in the photography system which is an aspect of the present invention.

The fixing tool 31 is attached to the access port 21, and fixes the borescope 30 to the casing 20 in a state in which the borescope 30 is inserted inside the jet engine 1. The fixing tool 31 has a mechanism for moving the borescope 30 in a direction of insertion into the jet engine 1 and a direction of withdrawal from the jet engine 1 according to step movement in a state in which the borescope 30 is held. A user can hold the borescope 30 with a hand to push the borescope 30 into the jet engine 1 or can draw the borescope 30 out of the jet engine 1.

The camera 32 is installed on an eyepiece section of the borescope 30. The camera 32 has an image sensor, continuously images light acquired by the borescope 30 in a state in which the blade rotates, and generates a blade image. The image sensor provided in the camera 32 may be either an area sensor in which pixels are arranged in a two-dimensional direction or a line sensor in which pixels are arranged in a one-dimensional direction. The camera 32 accumulates the generated image in an internal flash memory, and sequentially outputs the accumulated image as a frame image at a timing based on a predetermined frame cycle. The camera 32 is an example of an imaging section and a line sensor in the photography system which is an aspect of the present invention.

The camera 32 is connected to the PC 33 using a communication cable 34. The image generated by the camera 32 is received by the PC 33. Photography software is installed in the PC 33. The photography software is software for controlling the cameras 32 and recording or displaying taken images after the images generated by the cameras 32 are received by the PC 33.

The photography system 3 has a sensor configured to continuously detect states of blades which rotate and sequentially output detection values including information about the detected states. In this embodiment, an example in which an image sensor provided in the camera 32 detects the blade states will be described. An example in which a sensor other than the image sensor is used will be described in a modified example of this embodiment.

Although the camera 32 disposed outside the jet engine 1 photographs the blades in this embodiment, the borescope in which the image sensor is disposed may be used and the blades may be photographed in a state in which the image sensor is inserted by the borescope inside the jet engine 1.

Figure 6:
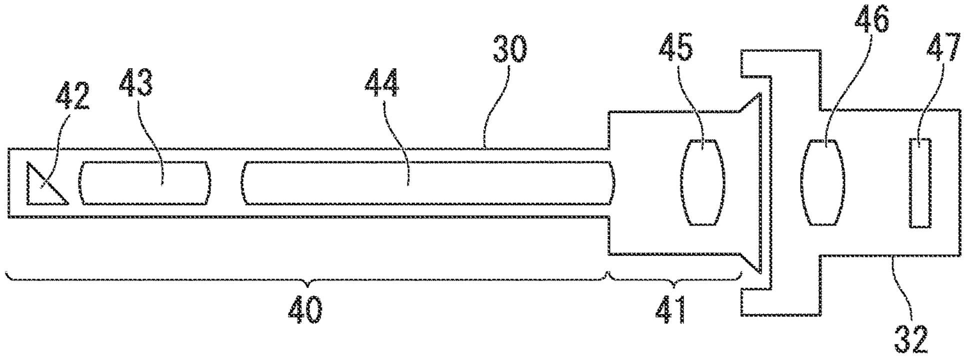
FIG. 6 is a diagram illustrating a cross-sectional structure of a borescope and a camera in the first embodiment of the present invention.

FIG. 6 illustrates a cross-sectional structure of the borescope 30 and the camera 32. The borescope 30 has a thin and long rigid insertion section 40 which is inserted into the jet engine 1 and a support section 41 which is positioned outside the jet engine 1 in use to support the insertion section 40.

An optical system for photographing the blades is disposed within the borescope 30. A mirror 42, an objective optical system 43, and a relay optical system 44 are disposed in the insertion section 40 as the optical system. The mirror 42 is disposed on a tip end of the insertion section 40, and guides light incident from the side surface of the borescope 30 to the insertion section 40 in the direction of the support section 41. The objective optical system 43 is disposed on a tip end side of the borescope 30 to form a real image of the blades. The relay optical system 44 transmits an image formed by the objective optical system 43 to the support section 41. An ocular optical system 45 configured to visualize the image transmitted by the relay optical system 44 is disposed on the support section 41. Although the borescope 30 has an illuminator in addition to the above, the illuminator is omitted in FIG. 6.

An imaging optical system 46 configured to form the image transmitted by the borescope 30 and a solid-state imaging element 47 (line sensor) configured to capture the blade image formed by the imaging optical system 46 are disposed in the camera 32.

Figure 7:
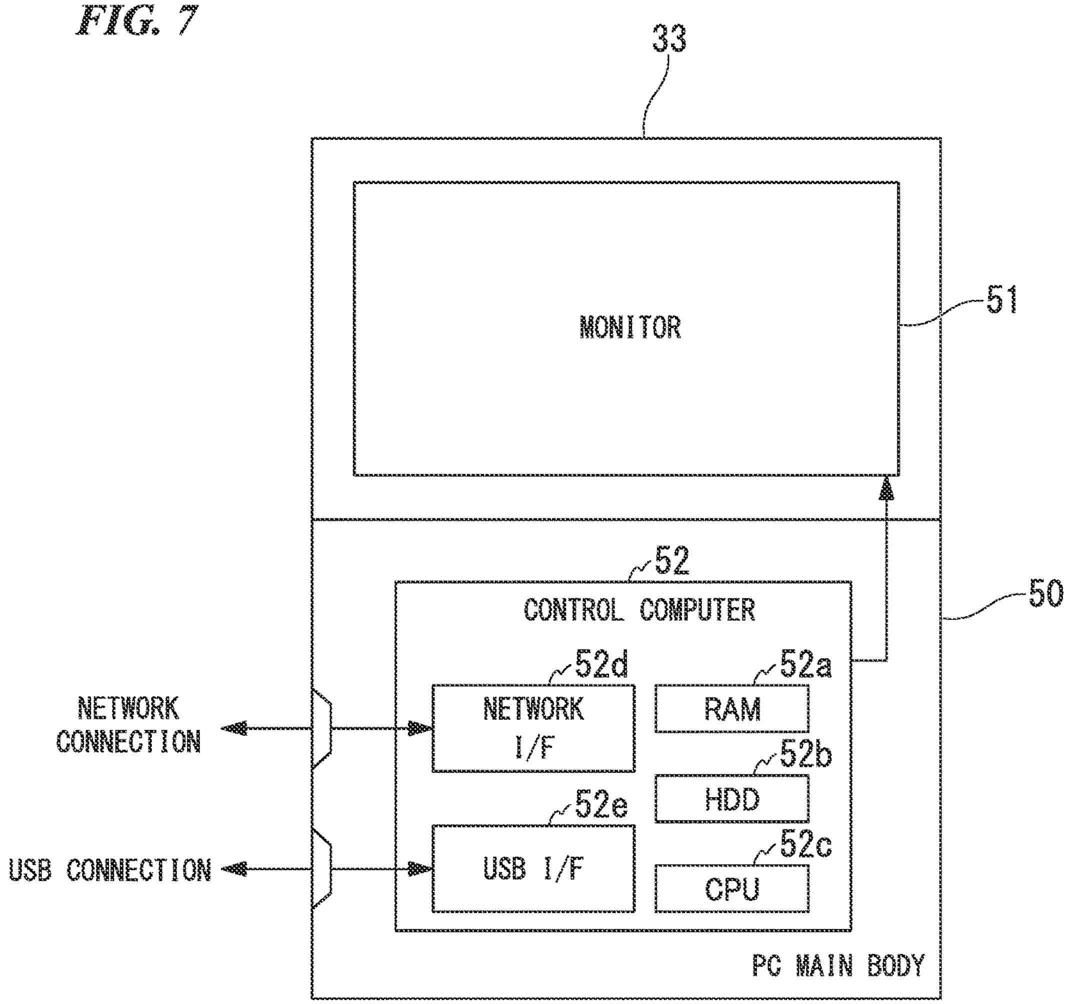
FIG. 7 is a block diagram illustrating a configuration of a personal computer (PC) in the first embodiment of the present invention.

FIG. 7 illustrates a configuration of the PC 33. The PC 33 has a PC main body 50 and a monitor 51. In the PC main body 50, a control computer 52 is embedded. The control computer 52 has a random access memory (RAM) 52*a*, a hard disk drive (HDD) 52*b*, a central processing unit (CPU) 52*c*, and a network interface (I/F) 52*d* and a Universal Serial Bus (USB) I/F 52*e* serving as external I/Fs. The control computer 52 is connected to the monitor 51 and the blade image, the screen of the photography software, etc. are displayed on the monitor 51.

The RAM 52*a* is used to temporarily store data such as image information necessary for a software operation. The photography software is stored in the HDD 52*b*. In addition, in this embodiment, an image for use in blade observation or inspection among images acquired from the camera 32 is saved inside the HDD 52*b*. According to a command code of the photography software stored in the HDD 52*b*, the CPU 52*c* executes an arithmetic operation for various control using the data stored in the RAM 52*a*. The CPU 52*c* is an example of an image acquisition section in the photography system which is an aspect of the present invention.

The network I/F 52*d* is an I/F for connecting the PC 33 to the camera 32 using the communication cable 34, and can input the image output from the camera 32 to the PC 33. In addition, it is possible to connect various sensors and the PC 33 via the network I/F 52*d* and input detection values output from various sensors to the PC 33. The USB I/F 52*e* is an I/F for connecting the PC 33 to an external device. Although not illustrated in FIG. 7, the PC main body 50 has a user IN for allowing the user to input various information.

Figure 8:
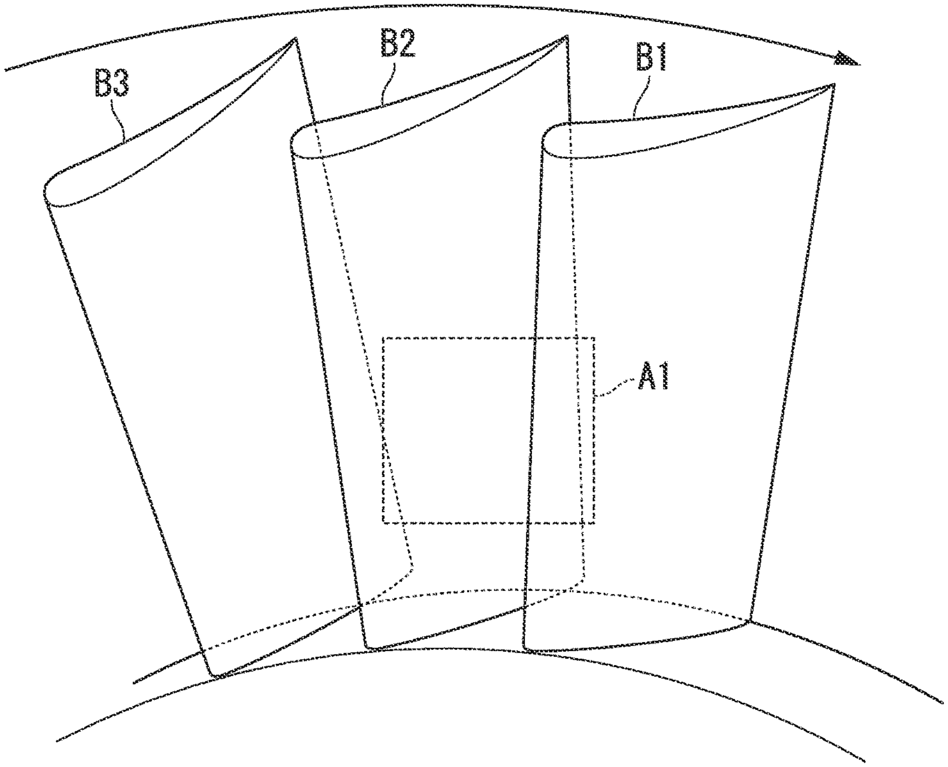
FIG. 8 is a diagram illustrating a photography area in the first embodiment of the present invention.

Next, a photography area which is a range in which the camera 32 captures an image will be described. Hereinafter, an example in which an area sensor is used as the image sensor provided in the camera 32 will be described. FIG. 8 illustrates a photography area in this embodiment. In FIG. 8, only three blades B1, B2, and B3 among blades disposed around the rotary shaft 18 are illustrated. In the example of this embodiment, shapes and sizes of the blades are the same and each blade has a curved surface. In addition, postures of the blades for the rotary shaft 18 are the same and the blades are disposed so that two adjacent blades overlap when viewed from the borescope 30 inserted into the jet engine 1.

The borescope 30 is fixed to a position at which light is acquired from the curved surface of each blade, and therefore photography is performed. The camera 32 photographs a photography area A1 illustrated in FIG. 8 to generate an image. Although the position of the photography area A1 for the casing 20 of the jet engine 1 is fixed because the borescope 30 is fixed during the photography, the position of the blade within the photography area A1 varies because each blade rotates according to rotation of the rotary shaft 18.

Although both blades B1 and B2 are found in the photography area A1 in FIG. 8, the blades B1 and B2 rotate and move when the blades rotate clockwise such that an area of a region of the blade B1 in the photography area A1 decreases and an area of a region of the blade B2 increases. When the blades further rotate, the blades B1 and B2 rotate and move such that there is no area of a region of the blade B1 in the photography area A1. When the blades further rotate, the blades B2 and B3 rotate and move such that a region of the blade B3 is shown in the photography area A1. Therefore, by analyzing the image captured in the photography area A1, it is possible to detect a blade passing through the photography area A1 and detect a position photographed on the detected blade.

Figure 9:
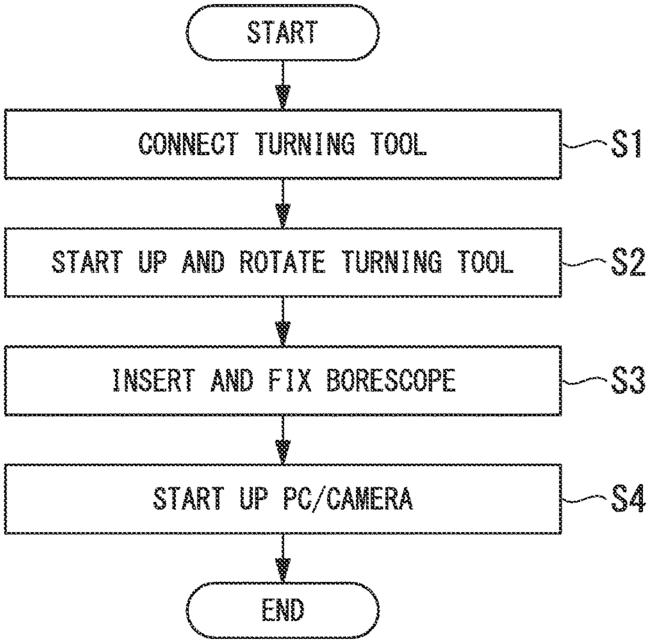
FIG. 9 is a flowchart illustrating a flow of a task to be performed before photography starts in the first embodiment of the present invention.

Next, a task necessary for preparation before the photography by the photography software starts will be described. FIG. 9 illustrates a flow of a task to be performed before the photography starts. In step S1, the turning tool 2 is connected to the gear box 22 of the jet engine 1. In step S2, the turning tool 2 starts up, and the rotary shaft 18 starts to rotate at a predetermined speed. The turning tool 2 constantly rotates at a predetermined speed in a state in which a connection to the gear box 22 is established. During the use of the photography software, control such as a change or stop of a rotation speed is not performed. Thereby, the blade also rotates at a constant speed.

In step S3, before the use of the photography software, the borescope 30 is inserted into each access port 21 and fixed by the fixing tool 31. In step S4, the PC 33 and all the cameras 32 start up.

Although the borescope 30 is inserted into the access port 21 after the turning tool 2 has started up in this embodiment, the borescope 30 may be inserted into the access port 21 before the turning tool 2 starts up. In addition, although the PC 33 and the cameras 32 start up after the borescope 30 has been inserted into the access port 21 in this embodiment, the PC 33 and the cameras 32 may start up before the borescope 30 is inserted into the access port 21.

Figure 10:
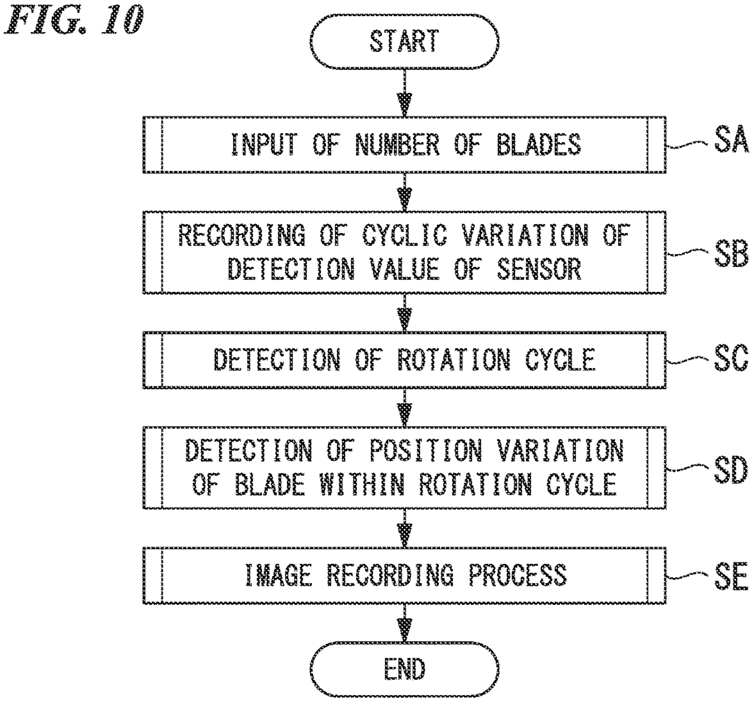
FIG. 10 is a flowchart illustrating a flow of an image recording operation in the first embodiment of the present invention.

Next, a flow of an image recording operation of photographing blades using photography software and recording an image captured by the photographing will be described. FIG. 10 illustrates the overall flow of the image recording operation. In this embodiment, an example in which the number of blades for one round (hereinafter referred to as the number of blades) disposed around the rotary shaft 18 in each stage is known will be described. In addition, in this embodiment, an example in which the rotation speed of the rotary shaft 18 is a constant speed will be described.

In step SA, the user inputs the number of blades of each stage to the PC 33, and the CPU 52*c* recognizes the input number of blades of each stage. In step SB, detection values output from the sensor configured to detect states of the blades which rotate are received by the PC 33 and cyclic variation of a detection value corresponding to rotation of the blade is recorded. In step SC, a rotation cycle which is a cycle in which the rotary shaft 18 makes one rotation is detected. In step SD, variation of a blade position in the rotation cycle is detected. In step SE, an image captured at a timing at which a position of each blade serves as the predetermined position is recorded.

The processes of steps SB to SE are independently performed for every stage. When the process of step SE ends, an image of blades for one round of each stage is recorded on the HDD 52*b*. Hereinafter, the processes of steps SB to SE will be described in detail.

Figure 11:
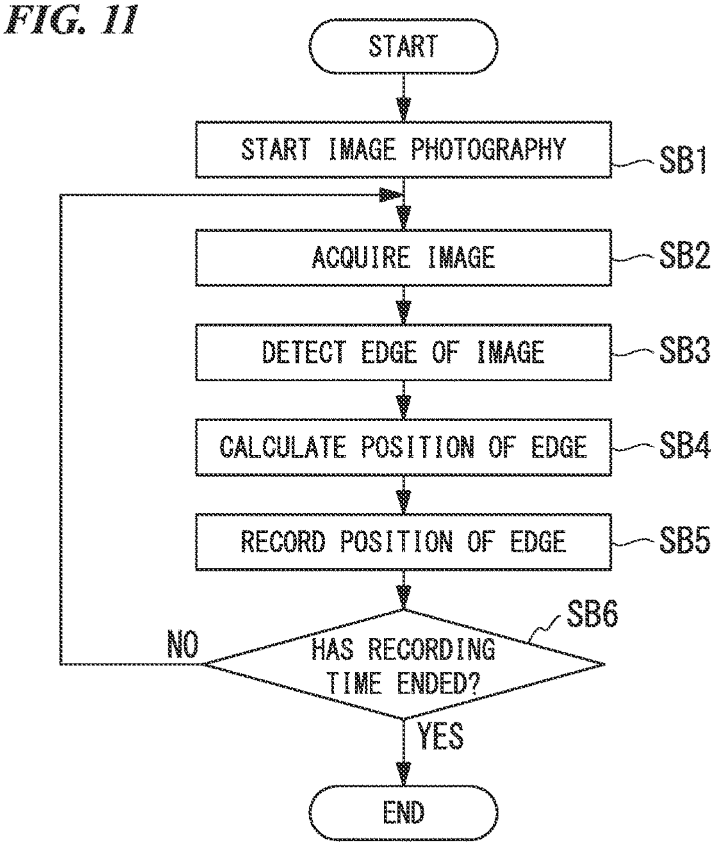
FIG. 11 is a flowchart illustrating a flow of the image recording operation in the first embodiment of the present invention.

FIG. 11 illustrates a flow of the process of step SB. In step SB1, the CPU 52*c* controls the camera 32 to start to capture an image. The camera 32 outputs images at predetermined frame cycle intervals. In step SB2, the CPU 52*c* acquires an image of one frame input to the PC 33 and stores the image in the RAM 52*a*.

Figure 12A:
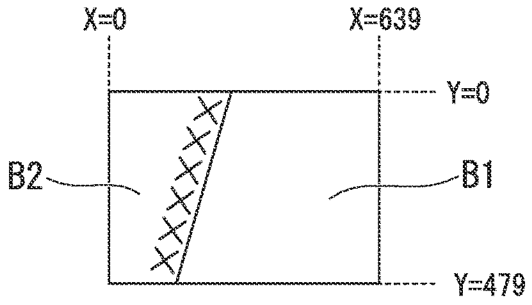
FIG. 12A is a diagram illustrating an image in the first embodiment of the present invention.

FIG. 12A illustrates an example of an image captured in the photography area A1 of FIG. 8. The image, for example, includes pixels of 640 horizontal (X) pixels×480 vertical (Y) pixels. A range of a horizontal position in the image is 0 to 639 and a range of a vertical position in the image is 0 to 479. In FIG. 12A, an edge of the blade B1 is shown. A region of the blade B1 before the blade B2 becomes bright and a region of the blade B2 covered with the region of the edge of the blade B1 becomes dark.

Figure 12B:
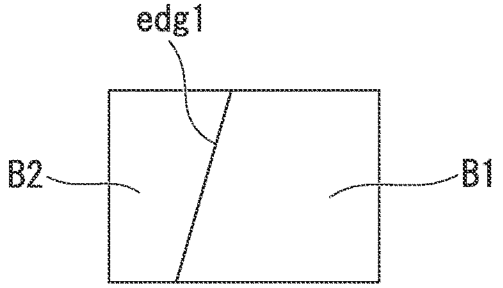
FIG. 12B is a diagram illustrating an edge detected from the image in the first embodiment of the present invention.

In step SB3, the CPU 52*c* performs image processing and detects an edge of the blade from the image. FIG. 12B illustrates the edge detected from the image illustrated in FIG. 12A. In FIG. 12B, an edge edg1 of the blade B1 is detected.

Figure 12C:
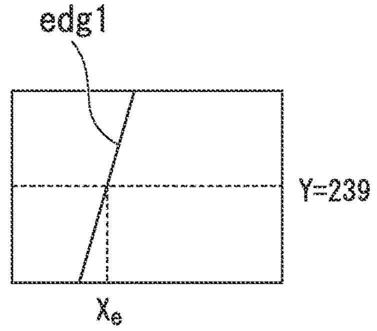
FIG. 12C is a diagram illustrating a position of the edge in the first embodiment of the present invention.

In step SB4, the CPU 52*c* calculates a position of the edge detected in step SB3 (hereinafter referred to as an edge position). FIG. 12C illustrates the detected edge position. In the image, a horizontal (X) position $X_e$ at a center position (Y=239) of the vertical (Y) direction is a position of the edge edg1. When no edge has been detected in step SB3, for example, the edge position is exceptionally handled as 0.

In step SB5, the CPU 52*c* records the edge position calculated in step SB4 as a detection value representing the state of the blade detected by the image sensor on the HDD 52*b*. The edge position is recorded in association with a time at which the image has been captured. In step SB6, the CPU 52*c* determines whether a predetermined recording time has ended. The recording time in this embodiment is a time for one or more rotations of the rotary shaft 18. When the recording time has not ended, an image of the next frame is acquired from the camera 32 in step SB2. In addition, when the recording time has ended, the process of step SB ends and subsequently the process of step SC is performed.

In this embodiment, an image is continuously captured in a cycle of a speed sufficiently faster than the speed of the blade which passes through the photography area A1 while the process of step SB is performed and images which are sufficiently greater in number than the number of blades for one round are captured. It is desirable to capture images equal in number to at least twice the number of blades for one round while the rotary shaft 18 makes one rotation.

Figure 13:
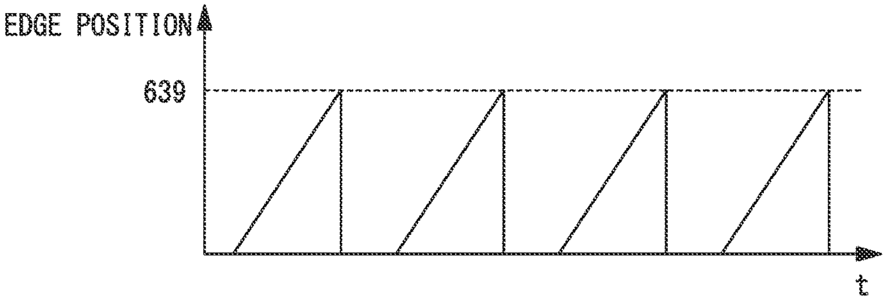
FIG. 13 is a graph illustrating time variation of the edge position in the first embodiment of the present invention.

The processes of steps SB2 to SB5 are iterated within the recording time and therefore time variation of the edge position is recorded on the HDD 52*b*. FIG. 13 is a graph illustrating the time variation of the edge position. The horizontal axis of the graph represents a time t and the vertical axis of the graph represents an edge position. The blade rotates at a constant speed and therefore the edge position cyclically varies and a peak portion and a bottom portion appear in the graph.

Figure 14:
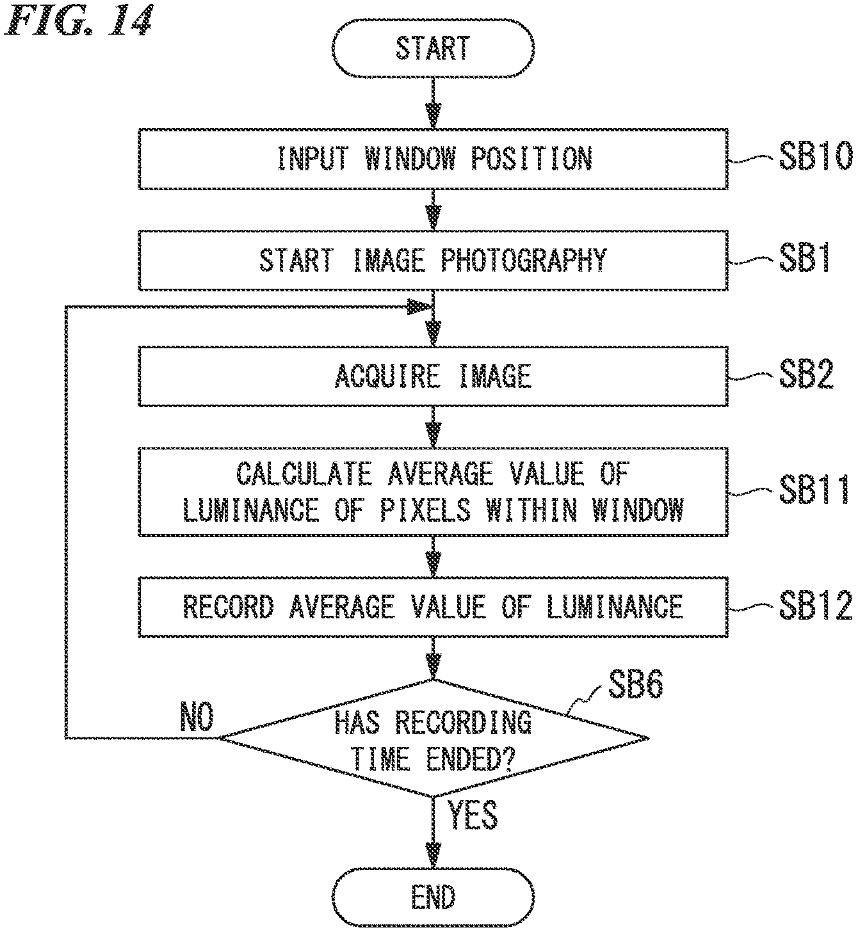
FIG. 14 is a flowchart illustrating a flow of the image recording operation in the first embodiment of the present invention.

FIG. 14 illustrates another example of the flow of the process of step SB. In FIG. 14, the processes of steps SB10 to SB12 are different from those illustrated in FIG. 11, and the processes of steps SB1, SB2, and SB6 are similar to those illustrated in FIG. 11. Hereinafter, only processing different from that illustrated in FIG. 11 will be described.

Figure 15:
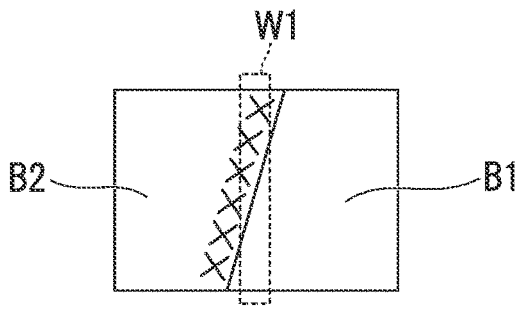
FIG. 15 is a diagram illustrating a window in the first embodiment of the present invention.

In step SB10, the user inputs a position of a window representing a region on which image processing is performed in the image acquired from the camera 32, and the CPU 52*c* recognizes the input window position. FIG. 15 illustrates an example of the window. At substantially the center of the image, a thin and long rectangular window W1 is set. The window W1 includes a plurality of pixels.

In the example illustrated in FIG. 14, time variation of a value of a pixel within the window is recorded. When the blade edge is included within the window and when the blade edge is not included within the window, the pixel value significantly varies. In order to more clearly show cyclic variation of the pixel value, it is desirable for a long side of the window to be set in a direction across a direction in which the blade moves in the image.

In step SB11, the CPU 52*c* calculates an average value of luminance of pixels within the window. By performing image processing within the window, a processing time is shorter than when image processing is performed on the overall image. In step SB12, the CPU 52*c* records the average value of the luminance calculated in step SB11 as a detection value representing a state of the blade detected by the image sensor on the HDD 52*b*. The average value of the luminance is recorded in association with a time at which the image has been captured.

Figure 16:
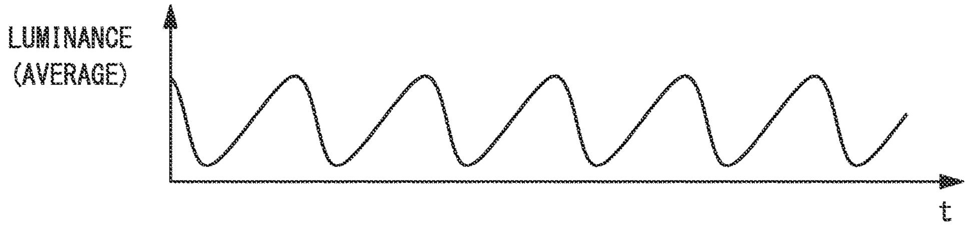
FIG. 16 is a graph illustrating time variation of an average value of luminance in the first embodiment of the present invention.

The processes of steps SB2 to SB12 are iterated within the recording time and therefore time variation of an average value of luminance is recorded on the HDD 52*b*. FIG. 16 is a graph illustrating the time variation of the average value of the luminance. The horizontal axis of the graph represents a time t and the vertical axis of the graph represents an average value of luminance. The average value of the luminance decreases when the blade edge is included within the window and the average value of the luminance increases when the blade edge is not included within the window. The blade rotates at a constant speed, and therefore the average value of the luminance cyclically varies and crest portions and trough portions appear in the graph.

Although an area sensor is used as the image sensor in the example illustrated in FIG. 14, a line sensor may be used as the image sensor. It is desirable to dispose the line sensor so that a direction in which pixels of the line sensor are arranged are across a direction in which the blade moves. It is possible to perform a process similar to the case in which a window is set in an image using the line sensor.

A plurality of windows of the image may be set. An example in which the plurality of windows are set in the image will be described in a modified example of this embodiment. In addition, a value other than luminance may be used as the pixel value. For example, values of RGB colors may be used.

Figure 17:
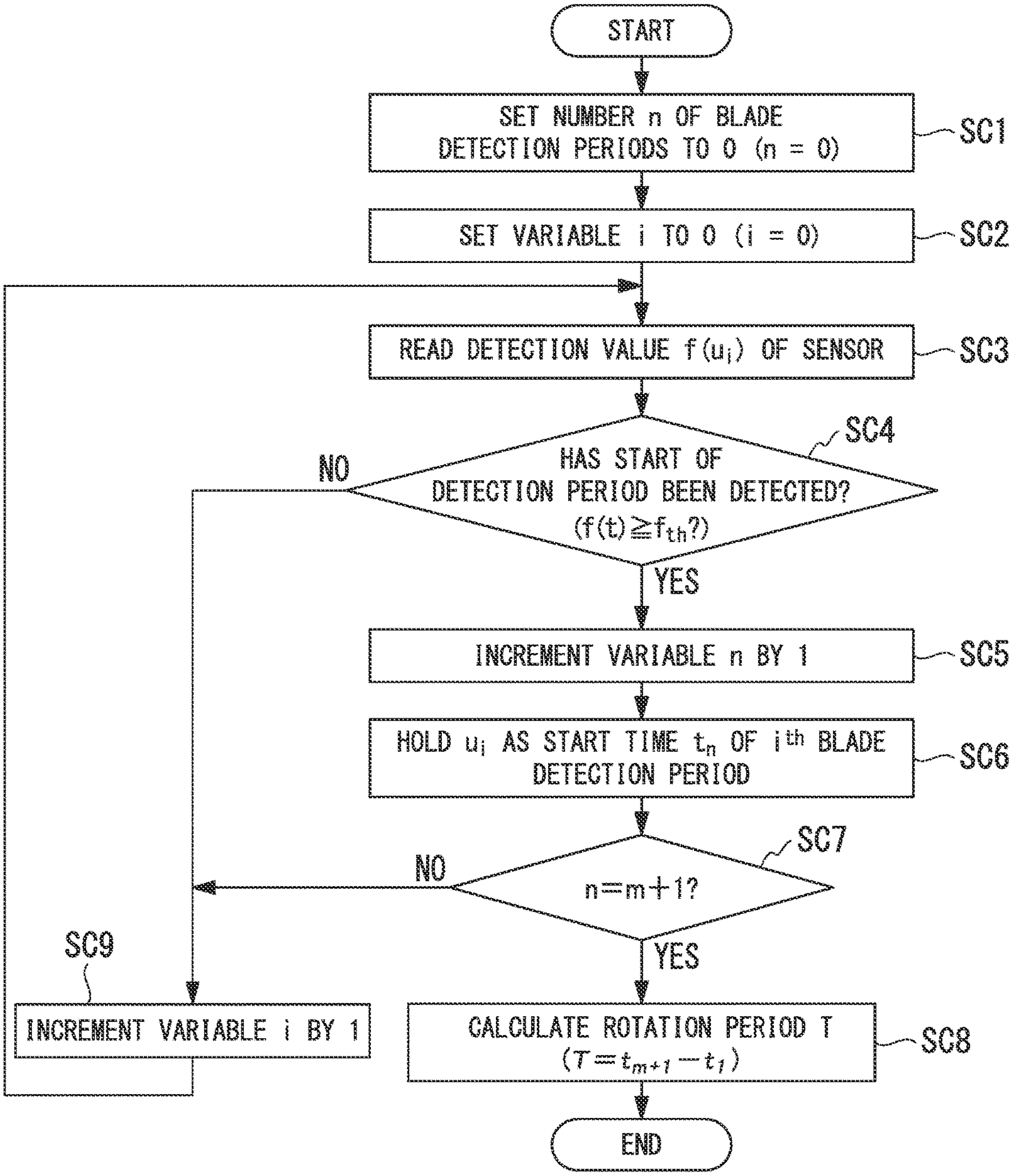
FIG. 17 is a flowchart illustrating a flow of the image recording operation in the first embodiment of the present invention.

FIG. 17 illustrates a flow of the process of step SC. In step SC1, the CPU 52*c* sets a variable n, which is the number of detection periods for every blade in time variation of a detection value f(t) of the sensor, to 0 (n=0). The detection value f(t) of the sensor in this embodiment is an edge position or a luminance average value.

Figure 18A:
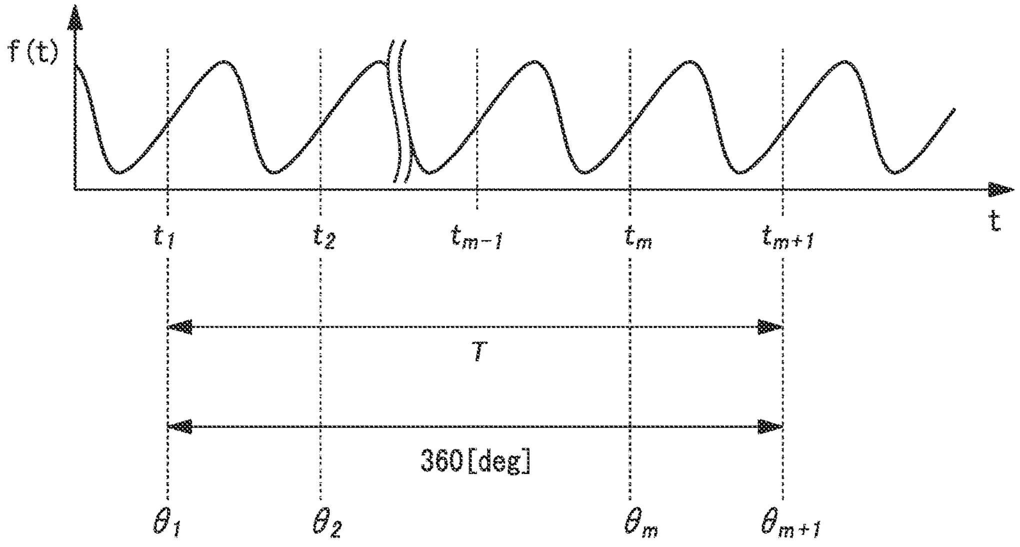
FIG. 18A is a graph illustrating time variation of a detection value of the sensor in the first embodiment of the present invention.

A detection period for every blade will be described using FIG. 18A. FIG. 18A is a graph of a detection value f(t) of the sensor. The horizontal axis of the graph represents a time t and the vertical axis of the graph is a detection value f(t) of the sensor. A period in time from a time $t_1$ at which a first blade has been detected to a time $t_{m+1}$ at which the rotary shaft 18 has made one rotation is equal to a rotation cycle T, and each of the number of peak portions and the number of bottom portions appearing in the period in time is the same as the number m of blades. At a time $t_2$ at which a time period of T/m has elapsed from the time $t_1$, the second blade is detected. Likewise, the next blade is detected every time a time period of T/m has elapsed. A period from when an $i^{th}$ (i=1, 2, . . . , m) blade is detected to when the next $(i+1)^{th}$ blade is detected (a period from the time $t_i$ to the time $t_{i+1}$) is a detection period of the $i^{th}$ blade. The time $t_i$ is defined as a start time of the detection period of the $i^{th}$ blade. The time $t_{m+1}$ is a start time of the detection period of the first blade in the next rotation cycle.

In this embodiment, a position of the blade found within the photography area is detected from a detection value of the sensor. The blades are cyclically disposed in a circumferential direction of the rotary shaft 18 and information about the position of the circumferential direction of the rotary shaft 18 is detected by the sensor as the blade position. The position of the circumferential direction of the rotary shaft 18 is represented by an angle when the rotary shaft 18 is viewed in a shaft direction of the rotary shaft 18. The position of the blade detected by the sensor at the start time $t_i$ of the detection period of the $i^{th}$ blade corresponds to an angle $\theta_i$. In other words, the position of the blade corresponding to the angle $\theta_i$ at the start time $t_i$ of the detection period of the $i^{th}$ blade is detected by the sensor. When the number of blades is m, a difference between the angle $\theta_1$ corresponding to a position of a first blade and an angle $\theta_{m+1}$ corresponding to a position of an $(m+1)^{th}$ blade is 360 deg.

Figure 18B:
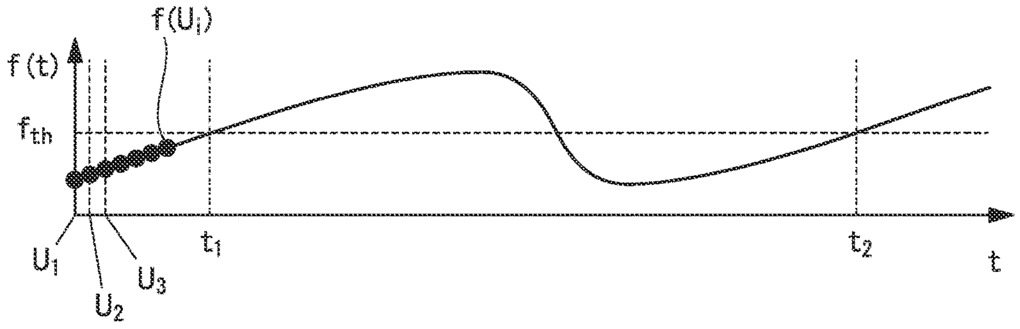
FIG. 18B is a graph illustrating time variation of a detection value of the sensor in the first embodiment of the present invention.

In step SC2, the CPU 52*c* sets a variable i to 0 (i=0). In step SC3, the CPU 52*c* reads a detection value $f(u_i)$ of the sensor at a time $u_i$ from the HDD 52*b*. FIG. 18B is a graph obtained by enlarging the graph illustrated in FIG. 18A in a time direction. The horizontal axis of the graph is a time t and the vertical axis of the graph is a detection value f(t) of the sensor. The sensor detects blade states at times $u_1$, $u_2$, . . . and outputs detection values $f(u_1)$, $f(u_2)$, . . . corresponding to the times.

In step SC4, the CPU 52*c* determines whether the start of the detection period of an $i^{th}$ blade has been detected by determining whether the detection value f(t) of the sensor is greater than or equal to a predetermined value $f_{th}$. In this example, a blade detection period starts when the detection value f(t) of the sensor is greater than or equal to the predetermined value $f_{th}$ while the detection value f(t) of the sensor increases. When the detection value f(t) of the sensor becomes a maximum value, the start of the blade detection period may be detected.

When the start of the detection period of the $i^{th}$ blade has not been detected, the process of step SC9 is performed. In step SC9, the CPU 52*c* increments the variable i by 1. Subsequently, in step SC3, a detection value $f(u_i)$ of the sensor at a time $u_i$ is read from the HDD 52*b*. In addition, when the start of the detection period of the $i^{th}$ blade has been detected, the process of step SC5 is performed. In step SC5, the CPU 52*c* increments the variable n by 1.

In step SC6, the CPU 52*c* stores the time $u_i$ as the start time $t_n$ of the detection period of the $i^{th}$ blade in the RAM 52*a*. In step SC7, the CPU 52*c* determines whether the variable n is (m+1). When the variable n is not (m+1), the process of step SC9 is performed. In addition, when the variable n is (m+1), processing ends in all detection periods of m blades and the process of step SC8 is performed. In step SC8, the CPU 52*c* calculates a rotation cycle T. The rotation cycle T is calculated as a difference between start times $t_1$ and $t_{m+1}$ of detection periods of the same blade. When the process of step SC8 has ended, the process of step SC ends and subsequently the process of step SD is performed.

Figure 19:
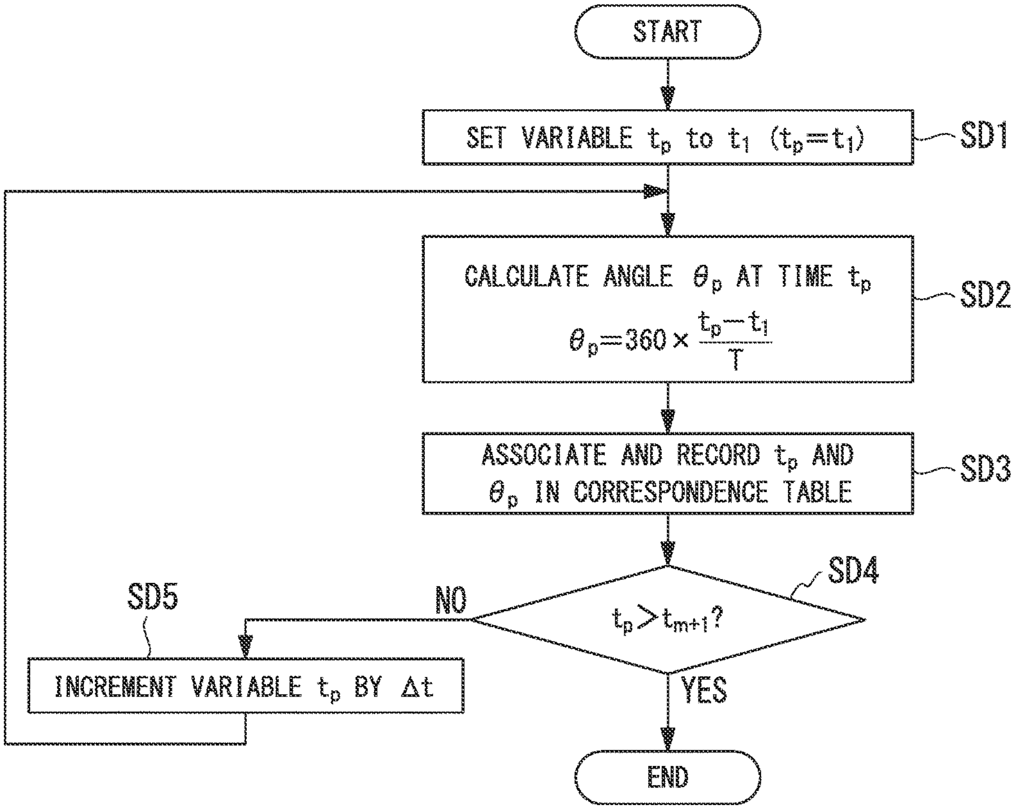
FIG. 19 is a flowchart illustrating a flow of the image recording operation in the first embodiment of the present invention.

FIG. 19 illustrates a flow of the process of step SD. In step SD1, the CPU 52*c* sets a time-related variable $t_p$ to $t_1$ ($t_p$=$t_1$). In step SD2, the CPU 52*c* calculates an angle $\theta_p$ at the time $t_p$ according to the following Equation (1).

$$\theta_p = 360 \times \frac{t_p - t_1}{T} \quad (1)$$

According to the process of step SD2, the position of the blade of the information detected by the sensor at a time $t_p$ is obtained as an angle $\theta_p$. The angle $\theta_p$ is 0 deg when $t_p$=$t_1$ and is 360 deg when $t_p$=$t_{m+1}$. Because the rotary shaft 18 rotates at a constant speed in this embodiment, the angle $\theta_p$ is proportional to a time period elapsed from the start time $t_1$ of the detection period of the $i^{th}$ blade.

In step SD3, the CPU 52*c* associates and records the time $t_p$ and the angle $\theta_p$ in a correspondence table recorded on the HDD 52*b*. The correspondence table is a table in which correspondence relationships between times from the start time $t_1$ to the start time $t_{m+1}$ of the detection period in the rotation cycle and angles are recorded.

In step SD4, the CPU 52*c* determines whether the time $t_p$ is a time exceeding the time $t_{m+1}$. When the time $t_p$ is a time before the time $t_{m+1}$, the process of step SD5 is performed. In step SD5, the CPU 52*c* increments the variable $t_p$ by a predetermined value Δt. The predetermined value Δt, for example, is equal to a cycle in which the sensor performs detection. In addition, when the time $t_p$ is the time exceeding the time $t_{m+1}$, the process of step SD ends and subsequently the process of step SE is performed.

Figure 20:
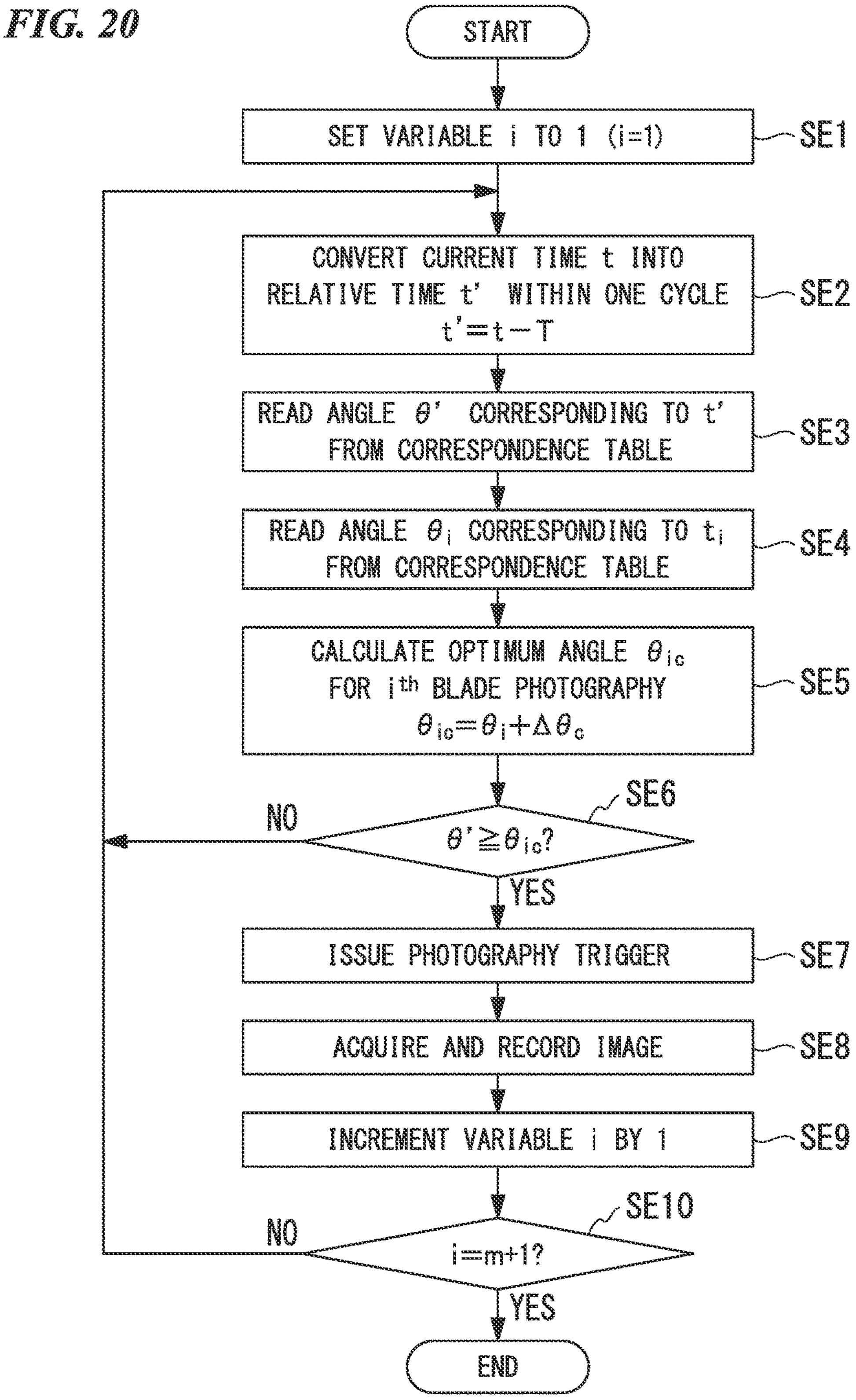
FIG. 20 is a flowchart illustrating a flow of the image recording operation in the first embodiment of the present invention.

FIG. 20 illustrates a flow of the process of step SE. For example, variation of a detection value of the sensor is recorded in step SB in a first cycle in which the rotary shaft 18 makes one rotation and the processes of steps SC and SD are performed in the next cycle immediately after the rotary shaft 18 has made one rotation. In this cycle, it is desirable to start the process of step SE until the start time of the detection period of a second blade is reached.

Figure 21:
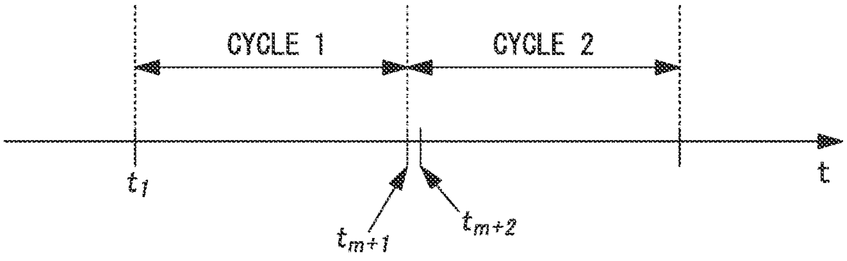
FIG. 21 is a diagram illustrating timings of processing in the first embodiment of the present invention.

FIG. 21 illustrates a time flow. The horizontal axis represents a time t. The rotary shaft 18 makes one rotation in a cycle 1 and the rotary shaft 18 makes one rotation in the next cycle 2. In the cycle 1, the detection value of the sensor is recorded according to the process of step SB. At the initiation of the cycle 2, the process of step SC is performed and start times $t_1, t_2, \ldots, t_{m+1}$ of detection periods of blades within the cycle 1 are detected based on detection values of the sensor recorded in the cycle 1. Because the number of blades is m, an $(m+1)^{th}$ blade is the same as the first blade. Although not detected in step SC, the start time $t_{m+2}$ within the cycle 2 is a start time of the detection period of a second blade. Until this time, it is desirable to start the process of step SE.

In step SE1, the CPU 52*c* sets the variable i to 1 (i=1). In step SE2, the CPU 52*c* converts a current time t into a relative time t' within one cycle detected in step SC according to the following Equation (2).

$$t'=t-T \quad (2)$$

According to the process in step SE2, the time $t_{m+1}$ within the cycle 2 of FIG. 21 is converted into a time $t_1$ within the cycle 1, and the time $t_{m+2}$ within the cycle 2 of FIG. 21 is converted into a time $t_2$ within the cycle 1. In step SE3, the CPU 52*c* reads an angle θ' corresponding to the relative time t' from the correspondence table. In step SE4, the CPU 52*c* reads an angle $\theta_i$ corresponding to a start time $t_i$ of a detection period of an $i^{th}$ blade from the correspondence table.

In step SE5, the CPU 52*c* calculates an optimum angle for photography of the $i^{th}$ blade according to the following Equation (3).

$$\theta_{ic}=\theta_i+\Delta\theta_c \quad (3)$$

Figure 22:
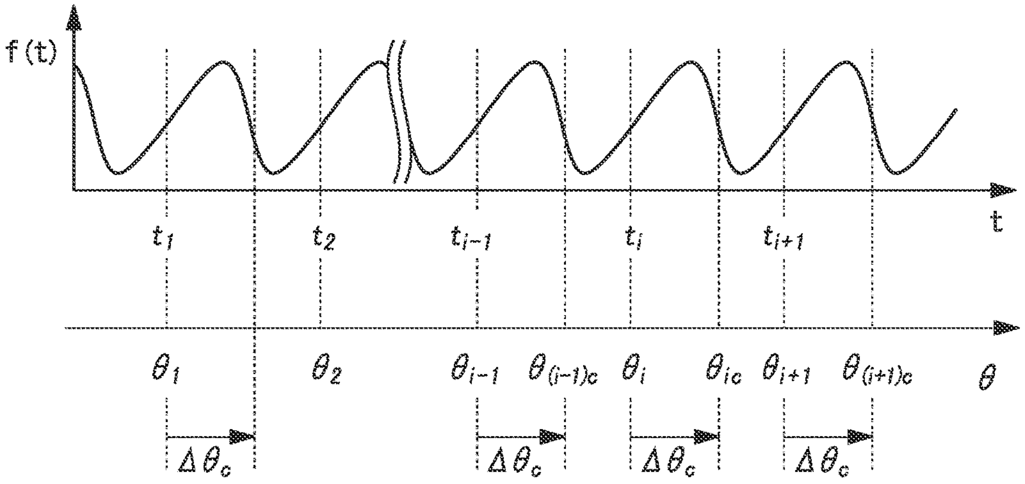
FIG. 22 is a graph illustrating time variation of a detection value of the sensor in the first embodiment of the present invention.

$\Delta\theta_c$ in Equation (3) is an angle corresponding to an optimum position for photography and is a known value common to all blades. FIG. 22 illustrates an optimum angle for blade photography. The horizontal axis of the graph represents a time t and the vertical axis of the graph represents a detection value f(t) of the sensor. The angle $\theta_{ic}$ advanced by $\Delta\theta_c$ from the angle $\theta_i$ corresponding to the start time $t_i$ of the detection period of each blade is an optimum angle for photography of each blade. If photography is performed when a position corresponding to the angle $\theta_{ic}$ is found in the photography area in the detection period of each blade, it is possible to acquire an image of a blade found at a predetermined posture suitable for observation.

In step SE6, the CPU 52*c* determines whether an angle θ' is greater than or equal to the angle $\theta_{ic}$. When the angle θ' is less than the angle $\theta_{ic}$, the process of step SE2 is performed in relation to a more advanced current time. In addition, when the angle θ' is greater than or equal to the angle $\theta_{ic}$, the process of step SE7 is performed.

In step SE7, the CPU 52*c* issues a photography trigger which is an image photography instruction. When the blade state is detected using the image sensor, the camera 32 stops photography before the process of step SE is started after the image photography has been started in step SB1. If the photography trigger is issued, the camera 32 captures and outputs an image. The image output from the camera 32 is input to the PC 33. In step SE8, the CPU 52*c* acquires the image input to the PC 33 and records the acquired image as an $i^{th}$ blade image on the HDD 52*b*. This image is an image captured when a position corresponding to the angle $\theta_{ic}$ is found in the photography area, and is an image of a blade found at a predetermined posture suitable for observation.

In step SE9, the CPU 52*c* increments a variable i by 1. In step SE10, the CPU 52*c* determines whether the variable i is (m+1). When the variable i is not (m+1), the process of step SE2 is performed in relation to a more advanced current time. In addition, when the variable i is (m+1), the process of step SE ends. According to the above process, images in all m blades are captured and recorded.

As described above, according to this embodiment, it is possible to automatically acquire an image suitable for blade observation by detecting the blade position based on cyclic variation of the detection value of the sensor and acquiring an image including a blade in which the detected position is a predetermined position. In addition, it is possible to efficiently acquire an image suitable for blade observation of each stage by performing the processes of steps SB to SE independently and in parallel for every stage.

Next, modified examples of this embodiment will be described.

First Modified Example

Figure 23A:
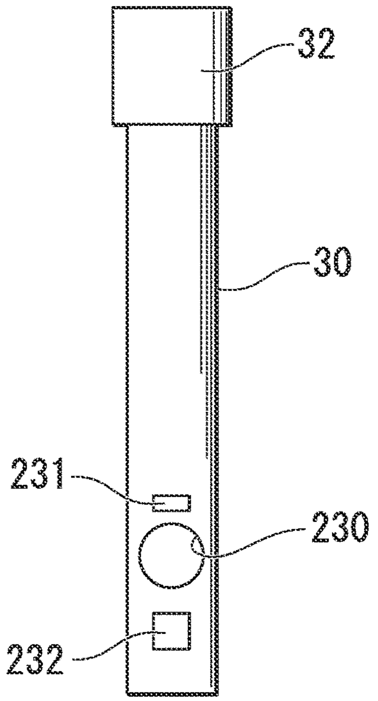
FIG. 23A is a front view of a borescope and a camera in the first embodiment of the present invention.
Figure 23B:
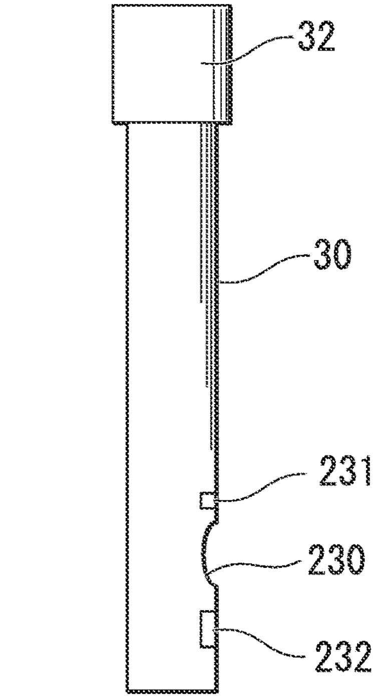
FIG. 23B is a side view of the borescope and the camera in the first embodiment of the present invention.

The first modified example is an example in which a blade state is detected using a sensor other than an image sensor. Each of FIGS. 23A and 23B illustrates a position at which the sensor is disposed. FIG. 23A is a view when the borescope 30 and the camera 32 are viewed from the front. FIG. 23B is a view when the borescope 30 and the camera 32 are viewed from the side. An illuminator 231 is disposed in the vicinity of an observation window 230 which acquires light from the subject. In addition, a sensor 232 is disposed on a tip end side rather than the observation window 230. The sensor 232 continuously detects the blade state and sequentially outputs the detection value representing the detected state.

When the sensor other than the image sensor is used, the process of step SB is different from those illustrated in FIGS. 11 and 14. When the sensor other than the image sensor is used, the detection value sequentially output from the sensor is input to the PC 33 and the CPU 52*c* records the input detection value on the HDD 52*b* in step SB. The detection value of the sensor includes information about a time at which the sensor has detected the blade state. When the sensor other than the image sensor is used, the processes of steps SC to SE are similar to the above-described processes.

For example, it is possible to use a distance sensor as the sensor. For example, the distance sensor which has a light emitting diode (LED) configured to radiate beam light such as infrared light and a position sensitive detector (PSD) sensor configured to detect light reflected by a physical object and detects a distance to a physical object on the principle of triangulation may be used. In addition, a distance sensor such as a radar or proximity sensor may be used.

Figure 24:
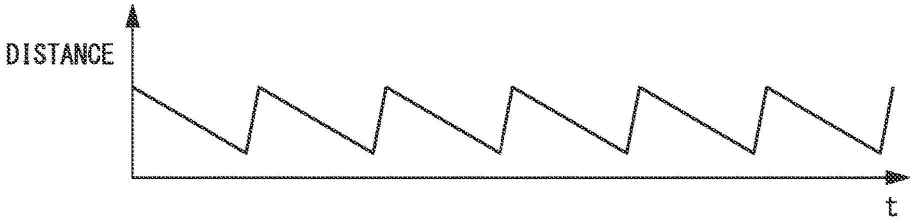
FIG. 24 is a graph illustrating time variation of a detection value (distance) of the sensor in the first embodiment of the present invention.

FIG. 24 is a graph illustrating time variation of a distance detected by the distance sensor. The horizontal axis of the graph is a time t and the vertical axis of the graph is a distance. The blade has a curved surface and the blade rotates at a constant speed, so that the distance from the distance sensor to the blade cyclically varies and crest portions and trough portions appear in the graph.

Figure 25:
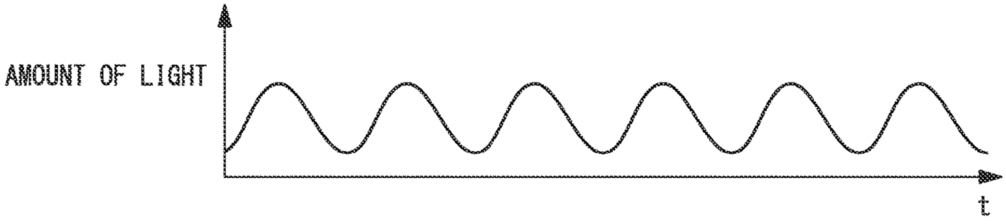
FIG. 25 is a graph illustrating time variation of a detection value (light amount) of the sensor in the first embodiment of the present invention.

For example, it is possible to use a light amount sensor as the sensor. The light amount sensor detects a light amount of light radiated from an illuminator and reflected by a physical object. FIG. 25 is a graph illustrating time variation of the light amount detected by the light amount sensor. The horizontal axis of the graph represents a time t and the vertical axis of the graph represents a light amount. The blade has a curved surface and the blade rotates at a constant speed, so that the distance from the light amount sensor to the blade or a tilt of the blade cyclically varies and a peak portion and a bottom portion appear in the graph. The light amount also depends upon a direction or spreading angle of radiated light, a direction of the light amount sensor, etc.

Second Modified Example

Figure 26A:
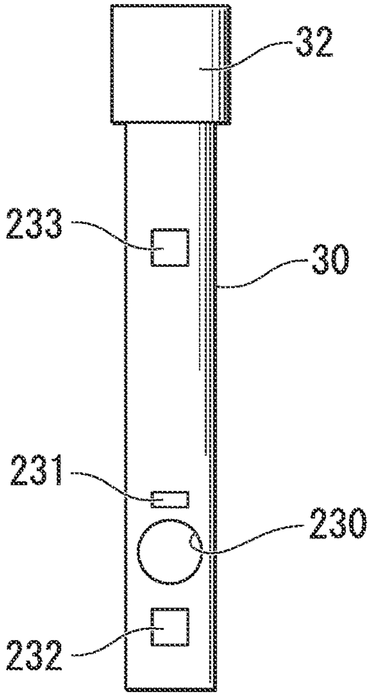
FIG. 26A is a front view of the borescope and the camera in the first embodiment of the present invention.
Figure 26B:
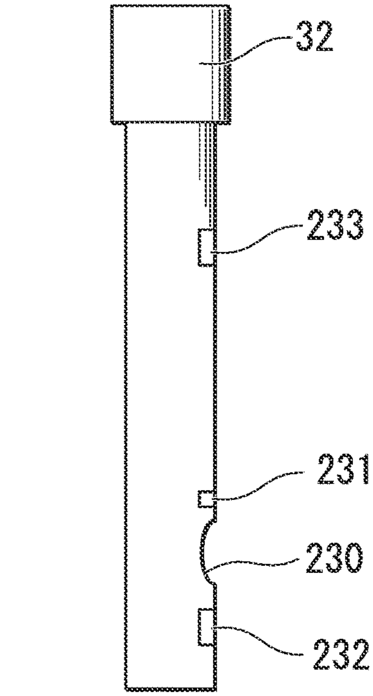
FIG. 26B is a side view of the borescope and the camera in the first embodiment of the present invention.

The second modified example is an example in which a blade state is detected based on cyclic variations of detection values of a plurality of sensors and detection results of the plurality of sensors are integrated. Each of FIGS. 26A and 26B illustrates positions at which the sensors are disposed. FIG. 26A is a view when the borescope 30 and the camera 32 are viewed from the front. FIG. 26B is a view when the borescope 30 and the camera 32 are viewed from the side. FIGS. 26A and 26B are different from FIGS. 24A and 24B in that a sensor 233 is added to the side of the camera 32 of the borescope 30.

Figure 27:
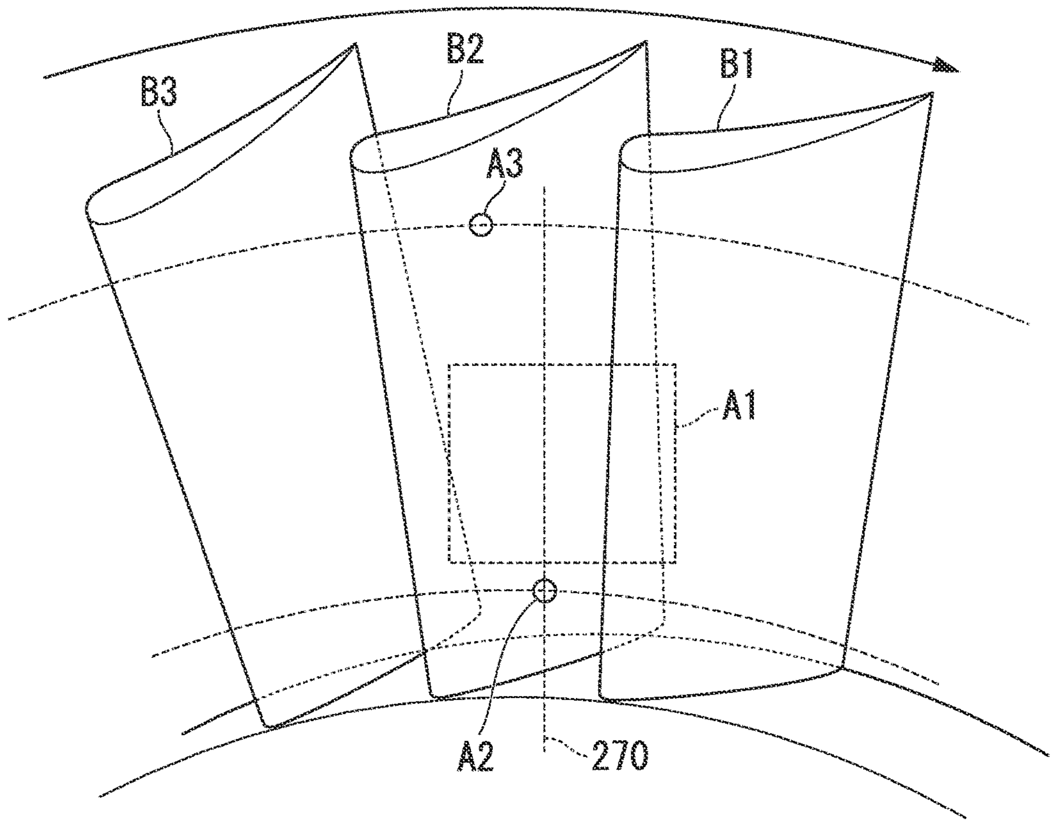
FIG. 27 is a diagram illustrating an information acquisition area of the sensor in the first embodiment of the present invention.

Although the sensors 232 and 233 are disposed so that angles for the rotary shaft 18 are the same in FIG. 26A, the sensors 232 and 233 may be disposed so that the angles of the sensors for the rotary shaft 18 are different. FIG. 27 illustrates an example in which the angles of the sensors for the rotary shaft 18 are different. A photography area A1 is a region in which an image is captured. Below the photography area A1, there is an information acquisition area A2 which is a region in which the sensor 232 acquires information. In addition, above the photography area A1, there is an information acquisition area A3 which is a region in which the sensor 233 acquires information. A dashed line 270 represents a position at which the angle for the rotary shaft 18 is the same. The information acquisition area A2 is present on the dashed line 270, but the information acquisition area A3 is absent on the dashed line 270.

Figure 28:
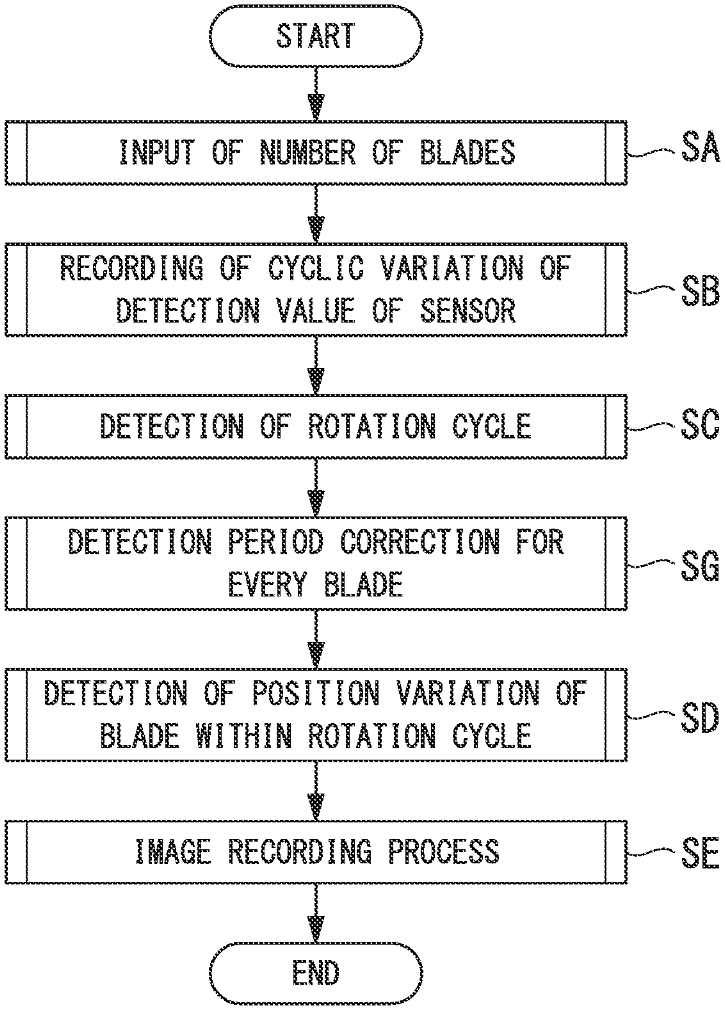
FIG. 28 is a flowchart illustrating a flow of the image recording operation in the first embodiment of the present invention.

FIG. 28 illustrates an overall flow of an image recording operation when a plurality of sensors are used. In FIG. 28, the process of step SG is performed between the process of step SC and the process of step SD. In step SB, detection values output from the plurality of sensors are recorded on the HDD 52*b*. In step SC, the detection values of the plurality of sensors are separately processed for each sensor and rotation cycles are calculated. In step SG a detection period for each blade detected in step SC is corrected. The process of step SG is an example in which detection results of the plurality of sensors are integrated. Other details are similar to the flow illustrated in FIG. 10.

Figure 29:
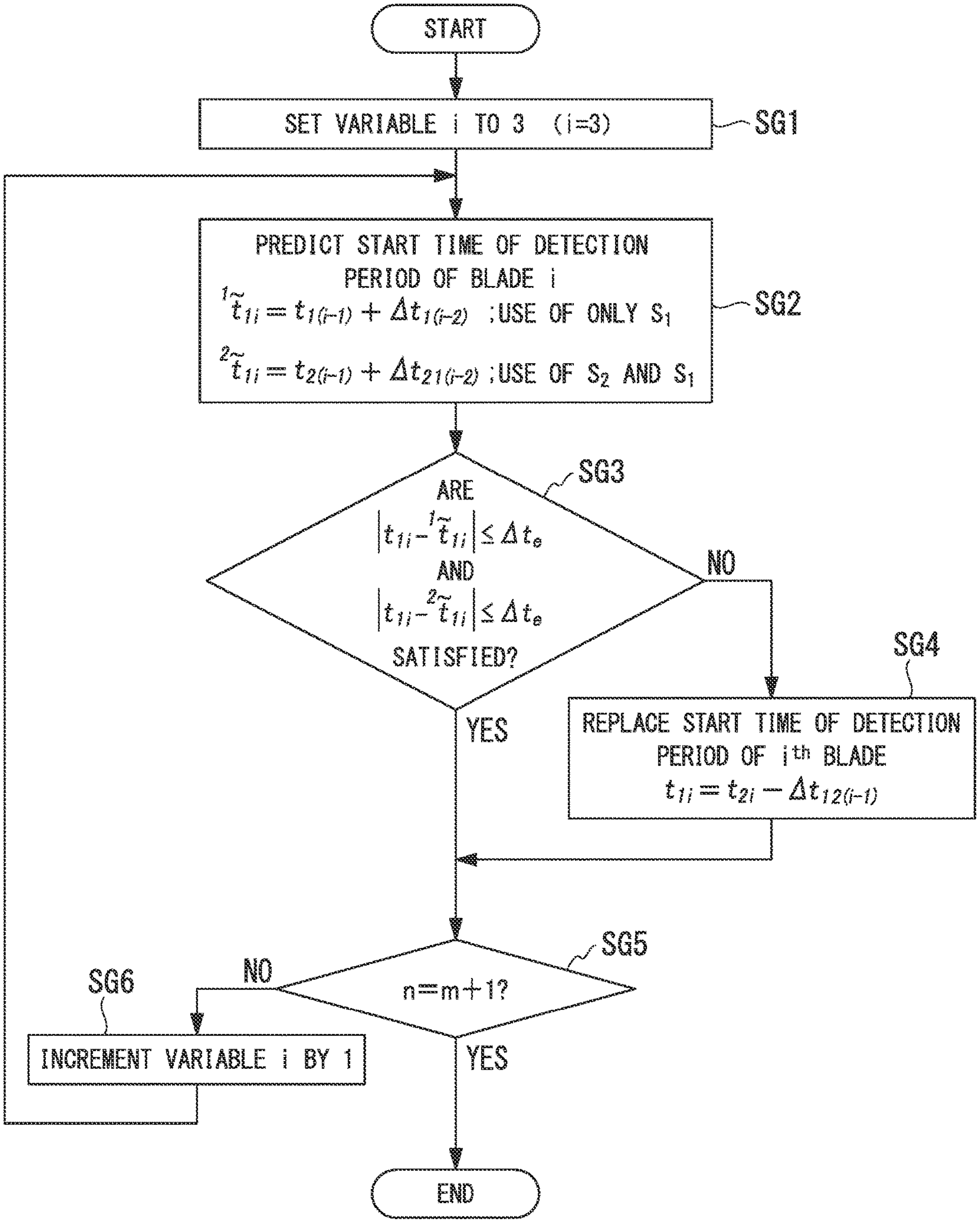
FIG. 29 is a flowchart illustrating a flow of the image recording operation in the first embodiment of the present invention.

FIG. 29 illustrates a flow of the process of step SG. In step SG1, the CPU 52*c* sets the variable i to 3 (i=3). In step SG2, the CPU 52*c* predicts the start time of the detection period of an $i^{th}$ blade. Hereinafter, content of the process of step SG2 will be described.

Figure 30:
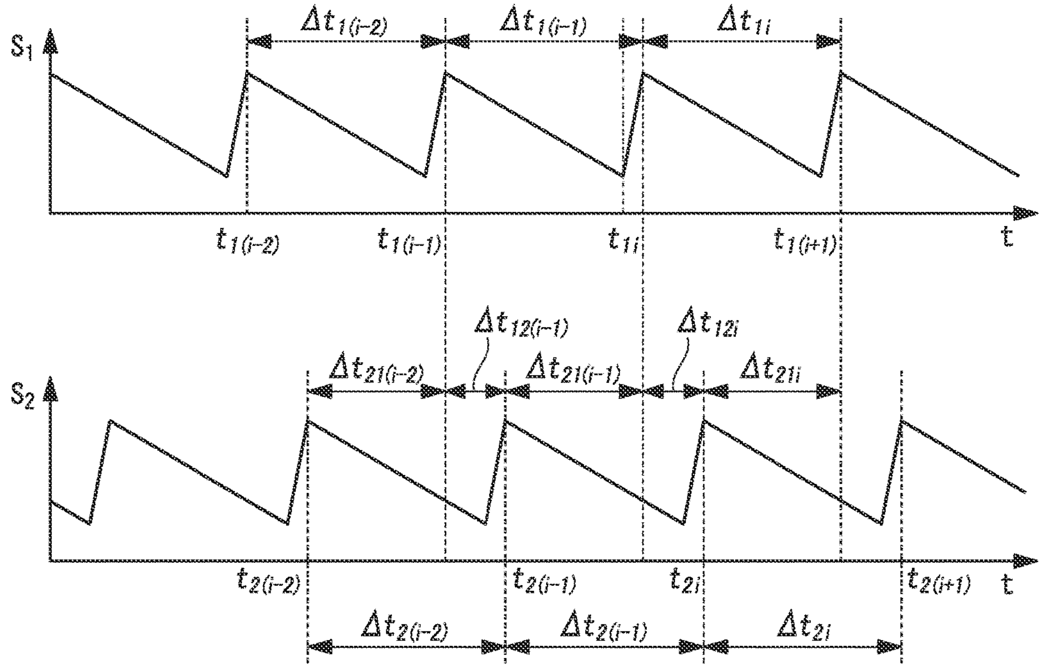
FIG. 30 is a graph illustrating time variation of a detection value of the sensor in the first embodiment of the present invention.

FIG. 30 is a graph of detection values of two sensors. The horizontal axis of the graph is a time t and the vertical axis of the graph represents detection values $S_1$ and $S_2$ of the sensors. In the example illustrated in FIG. 30, the start of the blade detection period is detected when the distance sensor is used and maximum values of the detection values $S_1$ and $S_2$ of the sensors are detected according to the process of step SC.

A start time of the detection period of the blade detected based on the detection value $S_1$ of the sensor is $t_{1i}$, and a start time of the detection period of the blade detected based on the detection value $S_2$ of the sensor is $t_{2i}$. A difference of a start time of a detection period of an adjacent blade detected based on the detection value $S_1$ of the sensor is $\Delta t_{1i}$, and a difference of a start time of a detection period of an adjacent blade detected based on the detection value $S_2$ of the sensor is $\Delta t_{2i}$. A difference between the start time $t_{1i}$ of the detection period of the blade detected based on the detection value $S_1$ of the sensor and the start time $t_{2i}$ of the detection period of the blade detected based on the detection value $S_2$ of the sensor is $\Delta t_{12i}$. A difference between a start time $t_{1(i+1)}$ of the detection period of the blade detected based on the detection value $S_1$ of the sensor and the start time $t_{2i}$ of the detection period of the blade detected based on the detection value $S_2$ of the sensor is $\Delta t_{21i}$.

$\Delta t_{1i}$, $\Delta t_{2i}$, $\Delta t_{12i}$, and $\Delta t_{21i}$ are represented by the following Equations (4a) to (4d).

$$\Delta t_{1i}=t_{1(i+1)}-t_{1i} \quad (4a)$$

$$\Delta t_{2i}=t_{2(i+1)}-t_{2i} \quad (4b)$$

$$\Delta t_{12i}=t_{2i}-t_{1i} \quad (4c)$$

$$\Delta t_{21i}=t_{1(i+1)i}-t_{2i} \quad (4d)$$

In step SG2, the CPU 52*c* calculates a start time based on only the detection value $S_1$ of the sensor and a start time based on the detection values $S_1$ and $S_2$ of the sensors shown in the following Equations (5a) and (5b), thereby predicting the start time $t_{1i}$ of the detection period of the $i^{th}$ blade detected based on the detection value $S_1$ of the sensor.

$$^{1}\tilde{t}_{1i}=t_{1(i-1)}+\Delta t_{1(i-2)} \quad (5a)$$

$$^{2}\tilde{t}_{1i}=t_{2(i-1)}+\Delta t_{21(i-2)} \quad (5b)$$

In step SG3, the CPU 52*c* determines whether a difference between the start time predicted in step SG2 and an actual start time $t_{1i}$ is less than or equal to a predetermined error $\Delta t_c$. In this case, it is determined whether both conditions of the following Equations (6a) and (6b) are satisfied.

$$|t_{1i}-{}^{1}\tilde{t}_{1i}|\leq\Delta t_e \quad (6a)$$

$$|t_{1i}-{}^{2}\tilde{t}_{1i}|\leq\Delta t_e \quad (6b)$$

When both the conditions of the following Equations (6a) and (6b) are satisfied, the process of step SG5 is performed. In this case, there is no disturbance in the detection value $S_1$ of the sensor, and the start time $t_{1i}$ of the detection period of the blade i is not corrected. In addition, when at least one condition of Equations (6a) and (6b) is not satisfied, the process of step SG4 is performed. In this case, there is a disturbance in the detection value $S_1$ of the sensor and the start time $t_{1i}$ of the detection period of the blade i is corrected.

In step SG4, the CPU 52*c* replaces the start time $t_{1i}$ of the detection period of the $i^{th}$ blade with the start time $t_{1i}$ calculated according to the following Equation (7).

$$t_{1i}=t_{2i}-\Delta t_{12(i-1)} \quad (7)$$

In step SG5, the CPU 52*c* determines whether the variable i is (m+1). When the variable i is not (m+1), the process of step SG6 is performed. In step SG6, the CPU 52*c* increments the variable i by 1. Subsequently, in step SG2, the start time $t_{1i}$ of the detection period of the $i^{th}$ blade is predicted. In addition, when the variable i is (m+1), the process of step SG ends. Subsequently, the process of step SD is performed.

When there is a disturbance in the detection value $S_1$ of the sensor in the above-described process, the start time of the detection period of the blade is corrected. Thereby, even when there is local loss or deformation in the blade or variation of local quality in the blade, it is possible to stably acquire cyclic variation of the detection value of the sensor. Although it is not determined whether there is a disturbance in the detection value $S_2$ of the sensor in the above-described process, the start time of the detection period detected based on the detection value $S_1$ of the sensor may be corrected when the determination is made, there is a disturbance in the detection value $S_1$ of the sensor, and there is a disturbance in the detection value $S_2$ of the sensor.

Third Modified Example

Figure 31:
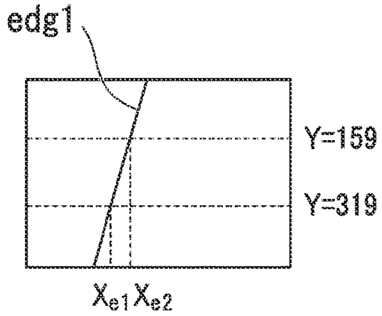
FIG. 31 is a diagram illustrating a position of the edge in the first embodiment of the present invention.

The third modified example is an example in which blade edge positions are calculated at a plurality of positions when a blade state is detected using the image sensor. FIG. 31 illustrates a position at which the edge position is calculated in step SB4. In an image, horizontal (X) positions $X_{e1}$ and $X_{e2}$ of the edge edg1 are calculated at two positions (Y=159 and 319) of the vertical (Y) direction. It is possible to apply the process illustrated in FIG. 29 by replacing detection values of the plurality of sensors with edge positions calculated at a plurality of positions.

Fourth Modified Example

Figure 32:
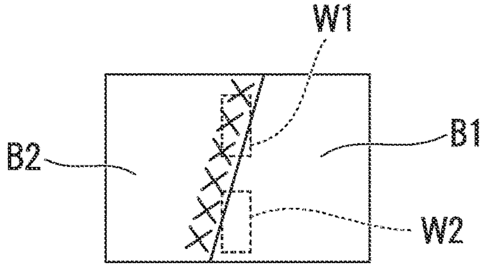
FIG. 32 is a diagram illustrating a window in the first embodiment of the present invention.

The fourth modified example is an example in which a plurality of windows are set when a blade state is detected using the image sensor. FIG. 32 illustrates an example of the window. Thin and long rectangular windows W1 and W2 are set above and below substantially the center of the image. A plurality of pixels are included in the windows W1 and W2. In step SB11, the average value of luminance within each window is calculated. It is possible to apply the process illustrated in FIG. 29 by replacing detection values of a plurality of sensors with average values of luminance calculated in the plurality of windows. A line sensor may be used as the image sensor, and an average value of luminance of pixels included in a first range among a plurality of pixels arranged in a one-dimensional direction and an average value of luminance of pixels included in a second range different from the first range may be calculated.

Although horizontal positions of two windows are the same in FIG. 32, the horizontal positions of the two windows may be different. In addition, although sizes of the two windows are the same in FIG. 32, the sizes of the two windows may be different.

Fifth Modified Example

The fifth modified example is an example in which both luminance and color information obtained from the same pixel are used when a blade state is detected using an image sensor. In step SB11, an average value of luminance of pixels within the window and an average value of values of any color (for example, R) of three colors (R, G, and B) in pixels within the window are calculated. It is possible to apply the process illustrated in FIG. 29 by replacing detection values of the plurality of sensors with an average value of luminance and an average value of color values.

Sixth Modified Example

The sixth modified example is an example in which an image is continuously captured simultaneously when a detection value of the sensor is recorded in step SB and an optimum image for observation is selected and recorded in step SE. In step SB, detection values are sequentially output from the sensor, images are sequentially output from the camera 32, and the detection values and the images are input to the PC 33. The detection values and images input to the PC 33 are recorded on the HDD 52*b*.

Figure 33:
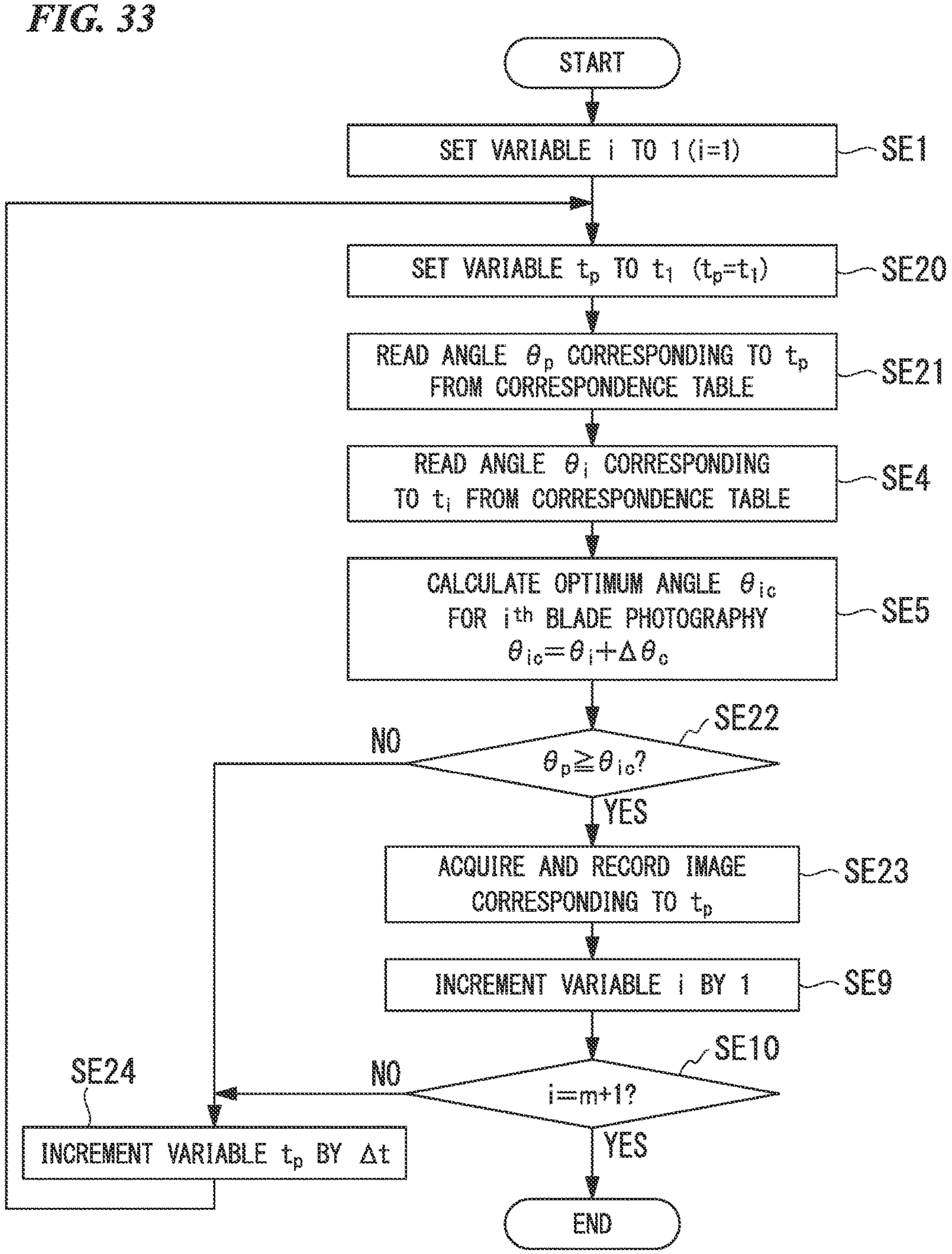
FIG. 33 is a flowchart illustrating a flow of the image recording operation in the first embodiment of the present invention.

FIG. 33 illustrates a flow of the process of step SE. In FIG. 33, the processes of steps SE20 to SE24 are different from those illustrated in FIG. 20, and the processes of steps SE1, SE4, SE5, SE9, and SE10 are the same as those illustrated in FIG. 20. Hereinafter, only processing different from that illustrated in FIG. 20 will be described.

In step SE20, the CPU 52*c* sets a time-related variable $t_p$ to $t_1$ ($t_p$=$t_1$). In step SE21, the CPU 52*c* reads an angle $\theta_p$ corresponding to a time $t_p$ from the correspondence table. In step SE22, the CPU 52*c* determines whether the angle $\theta_p$ is greater than or equal to the angle $\theta_i$. When the angle $\theta_p$ is greater than or equal to the angle $\theta_i$, the process of step SE23 is performed. In step SE23, the CPU 52*c* selects an image captured at a time corresponding to the time $t_p$ among images recorded on the HDD 52*b* and records the selected image as an image of an $i^{th}$ blade on the HDD 52*b*. In addition, when the angle $\theta_p$ is less than the angle $\theta_i$, the process of step SE24 is performed. In step SE24, the CPU 52*c* increments the variable $t_p$ by a predetermined value Δt. The predetermined value Δt, for example, is equal to a cycle in which the sensor performs detection.

The image selected in step SE23 is an image captured when a position corresponding to an angle $\theta_{ic}$ is found in the photography area and is an image of a blade found in a predetermined posture suitable for observation. Therefore, it is possible to automatically acquire an image suitable for blade observation. Among images recorded on the HDD 52*b* in step SB, images other than the image selected in step SE23, for example, are deleted.

Second Embodiment

Next, the second embodiment of the present invention will be described. Although a rotation speed of the rotary shaft 18 is a constant speed in the first embodiment, an example in which the rotation speed of the rotary shaft 18 is not a constant speed will be described in the second embodiment. Although the rotation speed is a constant speed when the rotary shaft 18 starts to rotate, for example, the following process is applied when the rotation speed is not a constant speed according to rotation of a gradually reduced speed or the like.

Figure 34:
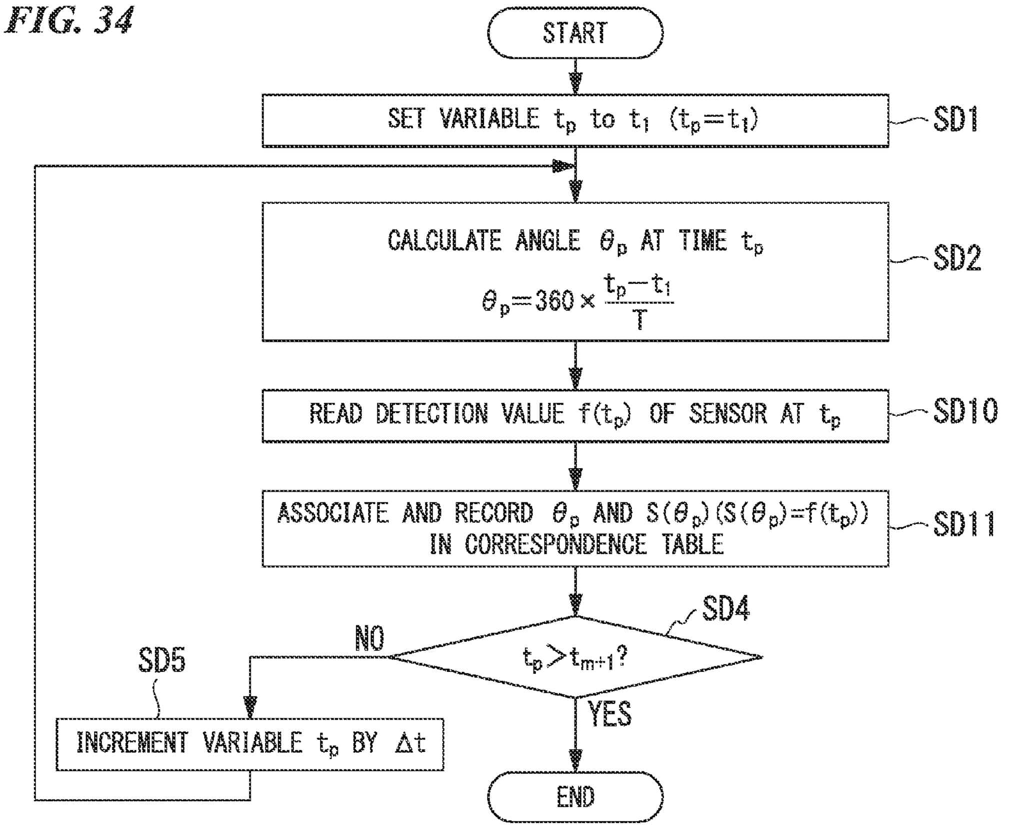
FIG. 34 is a flowchart illustrating a flow of the image recording operation in a second embodiment of the present invention.

In this embodiment, the processes of steps SD and SE are different from those in the first embodiment. FIG. 34 illustrates a flow of the process of step SD. In FIG. 34, the processes of steps SD10 and SD11 are different from those illustrated in FIG. 19, and the processes of SD1, SD2, SD4, and SD5 are similar to those illustrated in FIG. 19. Hereinafter, only processing different from that illustrated in FIG. 19 will be described.

In step SD10, the CPU 52*c* reads a detection value $f(t_p)$ of the sensor at a time $t_p$ from the HDD 52*b*. Hereinafter, for convenience, the detection value $f(t_p)$ of the sensor is represented by $S_p$. In step SD11, the CPU 52*c* associates and records the angle $\theta_p$ and the detection value $S_p$ of the sensor in a correspondence table recorded on the HDD 52*b*. The correspondence table is a table in which correspondence relationships between angles at times from the start time $t_1$ to the start time $t_{m+1}$ of the detection period in the rotation cycle and detection values of the sensor are recorded.

Figure 35:
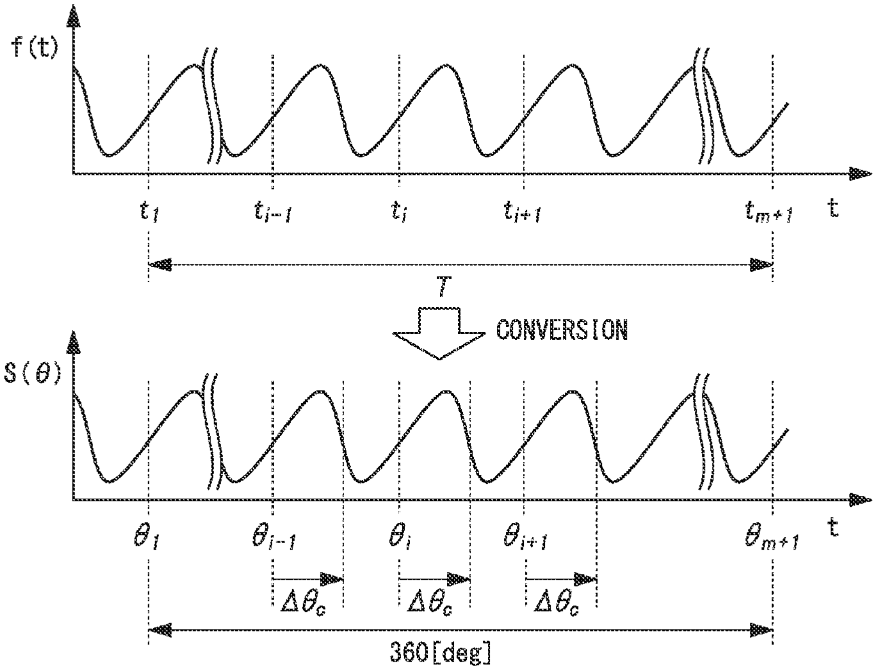
FIG. 35 is a graph illustrating time variation of a detection value of a sensor in the second embodiment of the present invention.

FIG. 35 illustrates graphs of the detection values of the sensor. The horizontal axis of the upper graph represents a time t and the vertical axis of the upper graph represents a detection value f(t) of the sensor. In addition, the horizontal axis of the lower graph represents an angle θ and the vertical axis of the lower graph represents a detection value S(θ) of the sensor. The detection value f(t) of the sensor recorded in step SB is associated with a time at which blade information has been detected. On the other hand, the detection value S(θ) of the sensor in the correspondence table recorded in step SD11 is associated with an angle corresponding to a position at which the blade information has been detected. Therefore, according to the process of step SD, the detection value based on the time is converted into a detection value based on the angle. An angle which is a predetermined angle $\Delta\theta$ greater than the angle $\theta_i$ corresponding to a start time $t_i$ of each detection period is an angle corresponding to a position of a blade suitable for observation.

When the rotary shaft 18 rotates at a constant speed, it is possible to acquire an image suitable for blade observation by acquiring an image when the angle $\theta_P$ which varies in proportion to a time is an optimum angle $\theta_{ic}$ for blade photography as in the first embodiment because lengths of detection periods of blades are the same and a time and an angle are proportional. However, when the rotary shaft 18 does not rotate at a constant speed, a timing at which the angle becomes an optimum angle $\theta_{ic}$ for blade photography is shifted from an angle obtained based on a proportional relation between the time and the angle.

Thus, in this embodiment, it is possible to acquire an image suitable for blade observation by detecting the angle $\theta$ from the detection value $S(\theta)$ of the sensor using the fact that the angle $\theta$ and the detection value $S(\theta)$ of the sensor are proportional regardless of the rotation speed of the rotary shaft 18 and acquiring an image when the angle $\theta$ becomes an optimum angle $\theta_{ic}$ for blade photography.

The process of step SD is performed assuming that the rotation speed of the rotary shaft 18 is a constant speed while the detection value of the sensor is acquired in step SB. Because the time and the angle are proportional when the rotation speed of the rotary shaft 18 is the constant speed, the angle $\theta_p$ is calculated based on this proportional relation in step SD.

Figure 36:
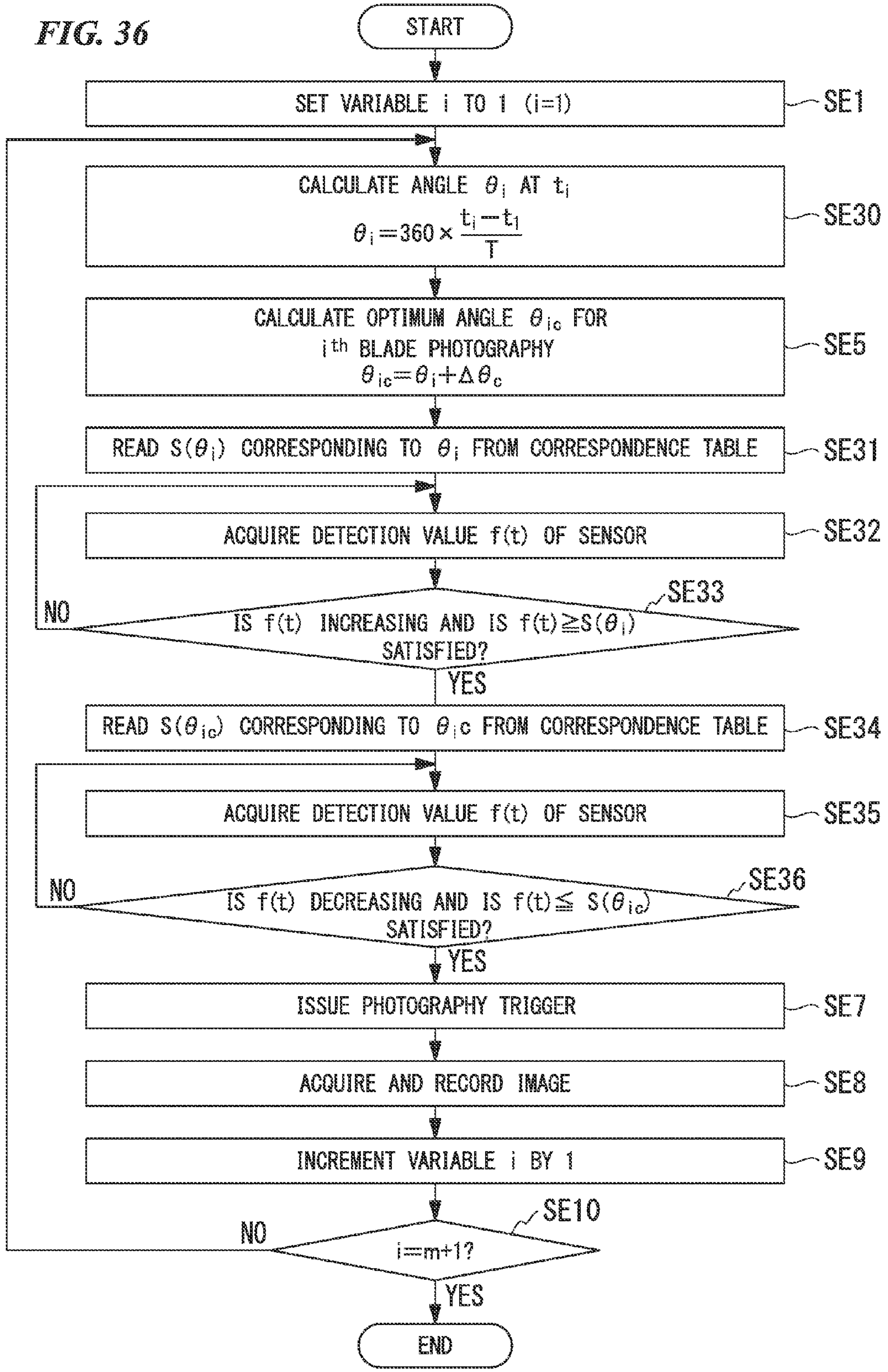
FIG. 36 is a flowchart illustrating a flow of the image recording operation in a second embodiment of the present invention.

FIG. 36 illustrates a flow of the process of step SE. In FIG. 36, the processes of steps SE30 to SE36 are different from those illustrated in FIG. 20 and the processes of steps SE1, SE5, and SE7 to SE10 are similar to those illustrated in FIG. 20. Hereinafter, only processing different from that illustrated in FIG. 20 will be described. The rotation speed of the rotary shaft 18 is not a constant speed while the process of step SE is performed.

In step SE30, the CPU 52*c* calculates the angle $\theta_i$ at a start time of a detection period of an $i^{th}$ blade according to the following Equation (8). Because the start time $t_i$ is a time during which the detection value of the sensor is acquired in step SB, it is possible to calculate the angle $\theta_i$ based on the proportional relation between the time and the angle by setting the rotation speed of the rotary shaft 18 as a constant speed.

$$\theta_i = 360 \times \frac{t_i - t_1}{T} \quad (8)$$

In step SE31, the CPU 52*c* reads the detection value $S(\theta_i)$ of the sensor corresponding to the angle $\theta_i$ from the correspondence table. In step SE32, the CPU 52*c* acquires a detection value f(t) input to the PC 33 output from the sensor and stores the detection value f(t) in the RAM 52*a*. In step SE33, the CPU 52*c* determines whether the detection value f(t) acquired in step SE32 is greater than an immediately previously acquired detection value f(t), that is, whether the detection value f(t) is increasing and whether the detection value f(t) is greater than or equal to the detection value $S(\theta_i)$.

When the detection value f(t) is increasing and the detection value f(t) is greater than or equal to the detection value $S(\theta_i)$, the process of step SE34 is performed. In addition, when the detection value f(t) is not increasing or when the detection value f(t) is less than the detection value $S(\theta_i)$, the detection value f(t) of the sensor is acquired again in step SE32. In addition, when the detection value f(t) is acquired in step SE32 for the first time and there is no immediately previously acquired detection value f(t), the detection value f(t) of the sensor is acquired again in step SE32.

In step SE34, the CPU 52*c* reads a detection value $S(\theta_{ic})$ of the sensor corresponding to an optimum angle $\theta_{ic}$ for photography from the correspondence table. In step SE35, the CPU 52*c* acquires the detection value f(t) input to the PC 33 output from the sensor and stores the detection value f(t) in the RAM 52*a*. In step SE36, the CPU 52*c* determines whether the detection value f(t) acquired in step SE35 is less than an immediately previously acquired detection value f(t), that is, whether the detection value f(t) is decreasing and whether the detection value f(t) is less than or equal to the detection value $S(\theta_{ic})$.

When the detection value f(t) is decreasing and the detection value f(t) is less than or equal to the detection value $S(\theta_{ic})$, the process of step SE7 is performed. In addition, when the detection value f(t) is not decreasing or when the detection value f(t) is greater than the detection value $S(\theta_{ic})$, the detection value f(t) of the sensor is acquired again in step SE35.

The determination of step SE33 is made to detect whether the blade detection period has started. In addition, the determination of step SE36 is made to detect whether the current angle is the optimum angle $\theta_{ic}$ for blade photography.

Figure 37:
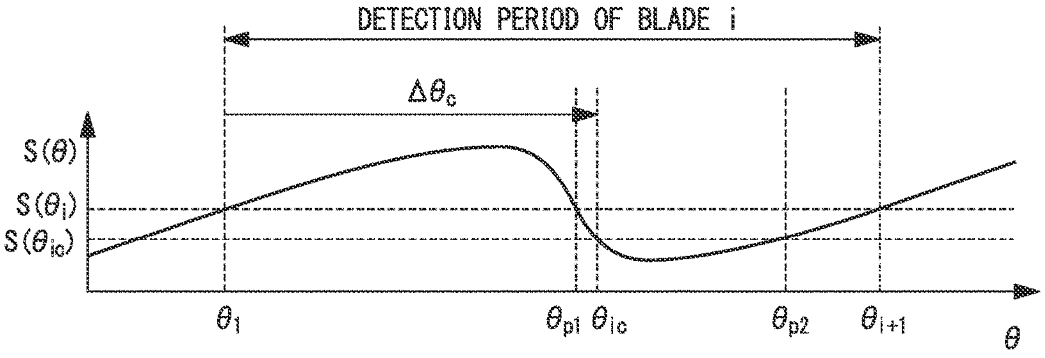
FIG. 37 is a graph illustrating a correspondence relationship between an angle and a detection value of the sensor in the second embodiment of the present invention.

FIG. 37 is a graph illustrating a correspondence relationship between an angle and a detection value of the sensor. The horizontal axis of the graph represents an angle $\theta$ and the vertical axis of the graph represents a detection value $S(\theta)$ of the sensor. In a detection period of a blade i, both angles $\theta_i$ and $\theta_{p1}$ correspond to a detection value $S(\theta_i)$. In the detection period of the blade i, both angles $\theta_{ic}$ and $\theta_{p2}$ correspond to a detection value $S(\theta_{ic})$. That is, it is difficult to uniquely specific an angle from the detection value of the sensor.

Thus, in steps SE33 and SE36, it is checked whether the detection value of the sensor is increasing or decreasing. Even when the detection value is $S(\theta_i)$, the angle is an angle $\theta_{p1}$, not $\theta_i$, when the detection value is decreasing. Therefore, it is possible to accurately detect the start of the blade detection period by checking whether the detection value of the sensor is increasing. In addition, even when the detection value is $S(\theta_{ic})$, the angle is $\theta_{p2}$, not $\theta_{ic}$, when the detection value is increasing. It is possible to accurately detect that the angle has reached an optimum angle for blade photography by checking whether the detection value of the sensor is decreasing in step SE36.

As described above, according to this embodiment, it is possible to automatically acquire an image suitable for blade observation even when the rotation speed of the rotary shaft 18 is not a constant speed by associating variation of a detection value of a sensor with a blade angle and detecting an angle corresponding to the detection value of the sensor. In this embodiment, it is also possible to perform the same modification as in each modified example in the first embodiment.

Third Embodiment

Next, the third embodiment of the present invention will be described. Although the number of blades is known in the first embodiment, an example in which the number of blades is not known will be described in the third embodiment. In addition, in the third embodiment, an example in which the rotation speed of the rotary shaft 18 is a constant speed will be described.

Figure 38:
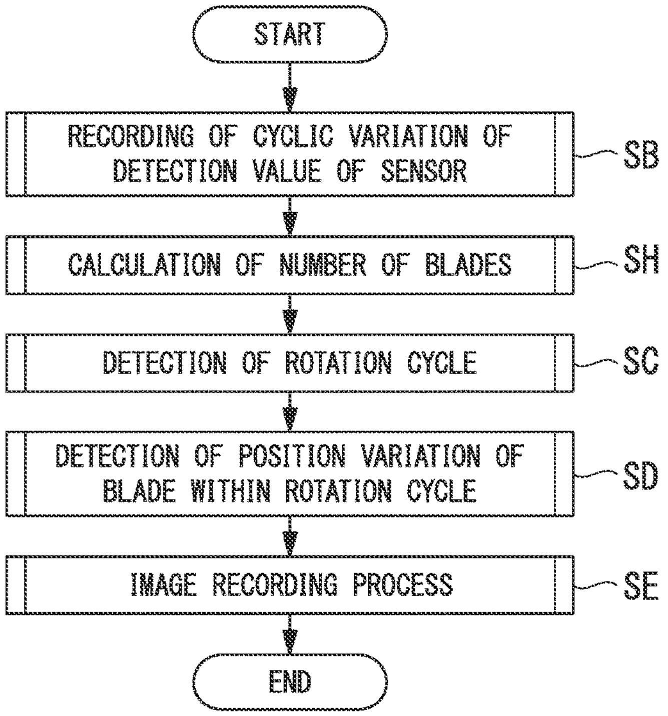
FIG. 38 is a flowchart illustrating a flow of the image recording operation in a third embodiment of the present invention.

FIG. 38 illustrates an overall flow of the image recording operation. In FIG. 38, the process of step SH is performed between the process of step SB and the process of step SC. In step SH, the number of blades is calculated. Other details are similar to those in the flow illustrated in FIG. 10. In this embodiment, two types of methods will be described as methods of calculating the number of blades.

(First Calculation Method)

Figure 39:
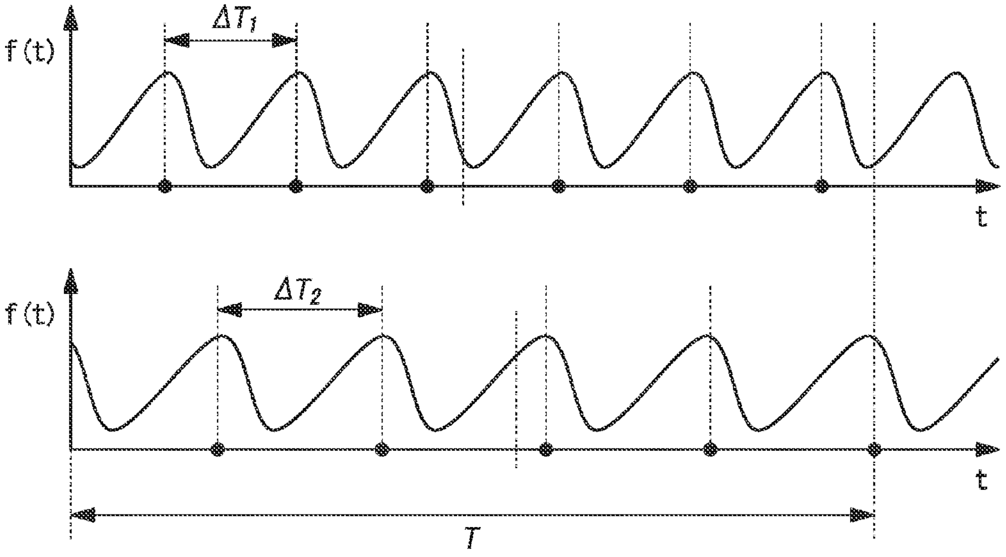
FIG. 39 is a graph illustrating time variation of a detection value of the sensor in the third embodiment of the present invention.

The first calculation method is a method of calculating a cycle of time variations of detection values of a sensor acquired in two stages for every stage and calculating the number of blades based on a cycle ratio corresponding to each stage. This method will be described with reference to FIG. 39. FIG. 39 illustrates a graph of detection values of the sensor. The horizontal axes of the two graphs represent a time t and the vertical axes of the two graphs represent a detection value f(t) of the sensor. The upper graph is a graph of detection values of the sensor acquired in a stage (hereinafter referred to as a stage #1) in which 6 blades are disposed. The lower graph is a graph of detection values of the sensor acquired in a stage (hereinafter referred to as a stage #2) in which 5 blades are disposed.

A time $\Delta T_1$ between maximum values of the detection values of the sensor in the graph of the stage #1 is a cycle of time variation of the detection value of the sensor and is equal to a time for which one blade of the stage #1 passes through the photography area. Likewise, a time $\Delta T_2$ between the maximum values of the detection values of the sensor in the graph of the stage #2 is the cycle of time variation of the detection value of the sensor and is equal to a time for which one blade of the stage #2 passes through the photography area. Assuming that the number of blades of the stage #1 is $n_1$ and the number of blades of the stage #2 is $n_2$, the following Equations (9a) and (9b) are established.

$$T_1 = n_1 \cdot \Delta T_1 \tag{9a}$$

$$T_2 = n_2 \cdot \Delta T_2 \tag{9b}$$

$T_1$ is a time for which $n_1$ blades of the stage #1 pass through the photography area, that is, a time for which each blade of the stage #1 makes one rotation. $T_2$ is a time for which $n_2$ blades of the stage #2 pass through the photography area, that is, a time for which each blade of the stage #2 makes one rotation. When the detection values of the sensor are simultaneously acquired in the stages #1 and #2, $T_1$ and $T_2$ are the same time. Because $T_1=T_2=T$ when the rotation cycle is assumed to be T, the following Equations (10a) and (10b) are established.

$$n_1 \cdot \Delta T_1 = n_2 \cdot \Delta T_2 \tag{10a}$$

$$\frac{n_2}{n_1} = \frac{\Delta T_1}{\Delta T_2} \tag{10b}$$

It is possible to obtain the number of blades of each stage by obtaining smallest integers $n_1$ and $n_2$ satisfying Equation (10b).

Figure 40:
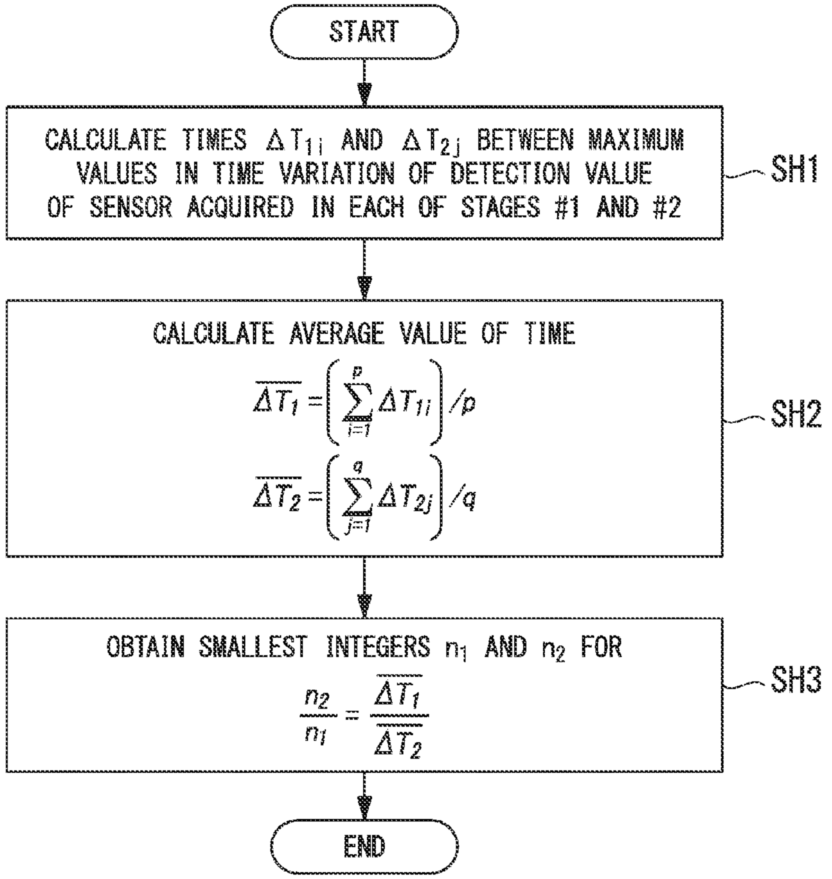
FIG. 40 is a flowchart illustrating a flow of the image recording operation in the third embodiment of the present invention.

FIG. 40 illustrates a flow of the process of step SH. In step SH1, the CPU 52*c* calculates a plurality of values for each of times $\Delta T_{1i}$ and $\Delta T_{2i}$ between the maximum values in time variations of detection values of the sensor recorded for predetermined recording times in the stages #1 and #2. For example, p times $\Delta T_{1i}$ are calculated and q times $\Delta T_{2i}$ are calculated. In step SH2, the CPU 52*c* calculates average values of the times according to the following Equations (11a) and (11b).

$$\overline{\Delta T_1} = \left(\sum_{i=1}^{p} \Delta T_{1i}\right) \Big/ p \tag{11a}$$

$$\overline{\Delta T_2} = \left(\sum_{j=1}^{q} \Delta T_{2j}\right) \Big/ q \tag{11b}$$

In step SH3, the CPU 52*c* obtains smallest integers $n_1$ and $n_2$ satisfying the following Equation (12).

$$\frac{n_2}{n_1} = \frac{\overline{\Delta T_1}}{\overline{\Delta T_2}} \tag{12}$$

When the process of step SH3 ends, the process of step SH ends and subsequently the process of step SC is performed. Because the number of blades is obtained according to the process of step SH, it is possible to perform a process similar to the process described in the first embodiment thereafter.

(Second Calculation Method)

Figure 41:
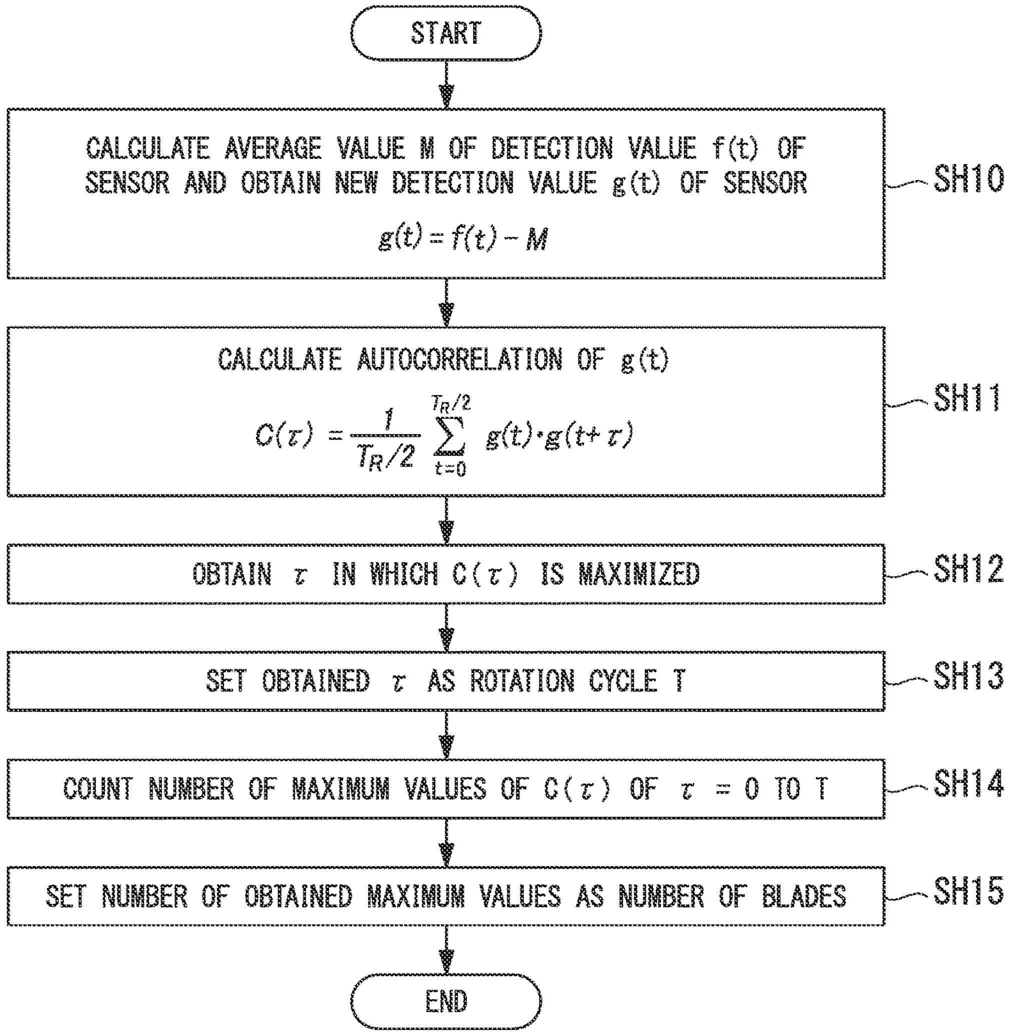
FIG. 41 is a flowchart illustrating a flow of the image recording operation in the third embodiment of the present invention.

The second calculation method is a method of calculating the number of blades based on an autocorrelation of a signal stream including a detection value of the sensor. FIG. 41 illustrates a flow of the process of step SH. In step SH10, an average value M of detection values f(t) of the sensor recorded for a predetermined recording time $T_R$ is calculated and a new detection value g(t) of the sensor is obtained according to the following Equation (13). It is desirable for the recording time $T_R$ to be a time for which the rotary shaft 18 makes two or more rotations.

$$g(t) = \frac{f(t)}{M} \tag{13}$$

Figure 42:
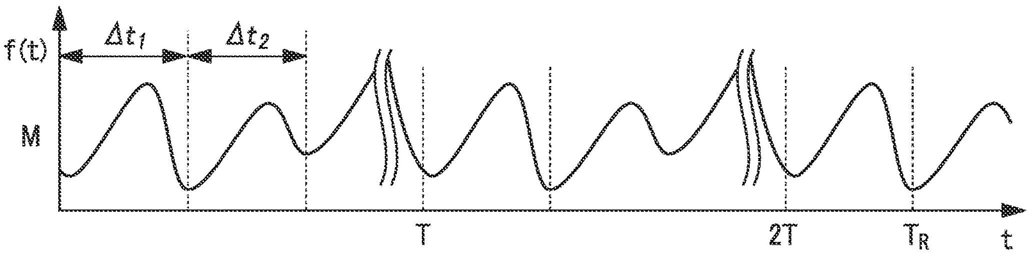
FIG. 42 is a graph illustrating time variation of a detection value of the sensor in the third embodiment of the present invention.

FIG. 42 is a graph of detection values of the sensor. The horizontal axis of the graph represents a time t and the vertical axis of the graph represents a detection value f(t) of the sensor. A time $\Delta T_1$ is a time during which a first blade passes through the photography area and a time $\Delta T_2$ is a time during which a second blade passes through the photography area.

In step SH11, the CPU 52*c* calculates an autocorrelation $C(\tau)$ of a detection value g(t) according to the following Equation (14).

$$C(\tau) = \frac{1}{T_R/2} \sum_{t=0}^{T_R/2} g(t) \cdot g(t+\tau) \tag{14}$$

Figure 43:
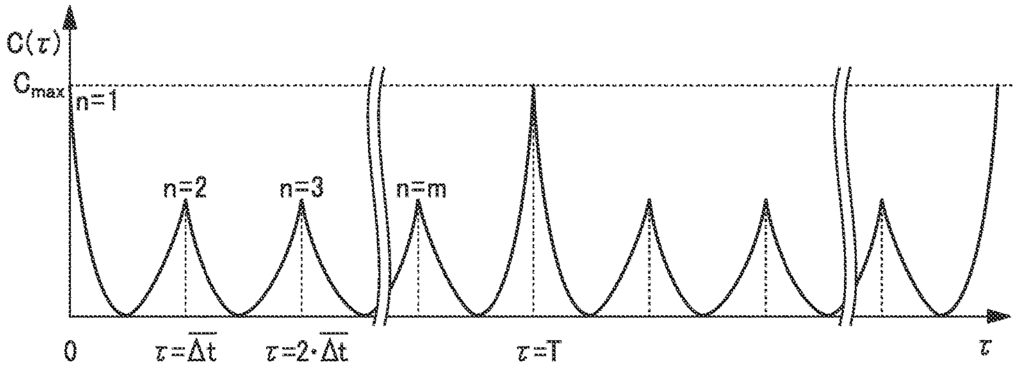
FIG. 43 is a graph illustrating variation of an autocorrelation in the third embodiment of the present invention.

In step SH12, the CPU 52*c* obtains $\tau$ in which the autocorrelation $C(\tau)$ is maximized. FIG. 43 is a graph of the autocorrelation $C(\tau)$. The horizontal axis of the graph represents $\tau$ and the vertical axis of the graph represents a value of the autocorrelation $C(\tau)$. Variation for $\tau$ of the autocorrelation $C(\tau)$ becomes cyclic variation. The autocorrelation $C(\tau)$ is maximized every time $\tau$ is incremented by a value corresponding to each of times $\Delta t_1$, $\Delta t_2$, . . . for which blades pass through the photography area. In addition, when $\tau$ is consistent with an integer multiple of the rotation cycle T, the autocorrelation $C(\tau)$ is maximized (maximum value $C_{max}$).

In step SH13, the CPU 52*c* sets $\tau$ obtained in step SH12 as the rotation cycle T. In step SH14, the CPU 52*c* counts the number of maximum values of the autocorrelation $C(\tau)$ in a range in which $\tau$ is 0 to T. In step SH15, the CPU 52*c* sets the number counted in step SH14 as the number of blades. Although the number of maximum values of the autocorrelation $C(\tau)$ is counted in the above-described process, the number of minimum values of $C(\tau)$ may be counted.

When the process of step SH15 ends, the process of step SH ends and subsequently the process of step SC is performed. Because the number of blades is obtained according to the process of step SH, it is possible to perform a process similar to the process described in the first embodiment thereafter.

In the second calculation method, it is possible to calculate the number of blades based on the detection value of the sensor acquired in one stage.

As described above, according to this embodiment, it is possible to calculate the number of blades even when the number of blades is not known and automatically acquire an image suitable for blade observation. In this embodiment, it is also possible to perform modifications similar to each modified example in the first embodiment.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A photography system comprising:

an observation scope inserted into a hole of a case in which a plurality of subjects, which are cyclically disposed around a rotary shaft and rotate around the rotary shaft, are housed along with the rotary shaft and the hole is formed to penetrate through the case, the observation scope being configured to sequentially acquire light from the plurality of subjects;

an imaging sensor configured to generate an image by continuously imaging light acquired by the observation scope;

a sensor configured to continuously detect states of the plurality of subjects which rotate and sequentially output detection values; and a controller configured to:

detect a position of the subject based on cyclic variation of the detection value and acquire the image including the subject at the detected position which is a predetermined position, detect a cycle in which the rotary shaft rotates based on the cyclic variation of the detection value and detects a position corresponding to a time by associating the time based on the cycle with variation of the position of the subject, and detect a cycle in which the rotary shaft rotates by calculating a time in which the states of the subjects equal in number to the number of subjects disposed around the rotary shaft are detected by the sensor based on cyclic variations of the detection values, a plurality of sets of subject groups, each of which includes the plurality of subjects that are cyclically disposed around the rotary shaft and rotate around the rotary shaft, are housed along with the rotary shaft and the hole comprises a plurality of holes formed in the case to penetrate through the case, the observation scope comprises a plurality of observation scopes including first and second observation scopes which sequentially acquire light from the plurality of subjects included in the one set of subject groups among the plurality of sets of subject groups are inserted into the plurality of holes, the sensor comprises a plurality of sensors including a first sensor configured to detect the states of the plurality of subjects from which the first observation scope acquires light and a second sensor configured to detect the states of the plurality of subjects from which the second observation scope acquires light are provided, and the controller is further configured to:

detect a first cycle which is a cycle of variation of the detection value output by the first sensor, detect a second cycle which is a cycle of variation of the detection value output by the second sensor, and calculate the number of subjects disposed around the rotary shaft based on a ratio between the first cycle and the second cycle.

2. The photography system according to claim 1, wherein the controller is further configured to detect a cycle in which the rotary shaft rotates based on the cyclic variation of the detection value and detects a position corresponding to the detection value by associating the variation of the detection value within the cycle with variation of the position of the subject.

3. The photography system according to claim 1, wherein the sensor is an image sensor which continuously images the subject and sequentially outputs images.

4. The photography system according to claim 3, wherein the controller is further configured to detect an edge from the image output from the image sensor and detects the position of the subject based on cyclic variation of the detected edge position.

5. The photography system according to claim 3, wherein the controller is further configured to detect the position of the subject based on cyclic variations of pixel values in a plurality of pixels of an image output from the image sensor.

6. The photography system according to claim 3, wherein the controller is further configured to detect the position of the subject based on cyclic variations of a pixel value in a first pixel of the image output by the image sensor and a pixel value in a second pixel of the image output by the image sensor.

7. The photography system according to claim 1, wherein the imaging sensor performs imaging at an indicated timing, and the controller is further configured to instruct the imaging sensor to perform the imaging at a timing at which the position of the subject becomes a predetermined position and acquires an image generated by the imaging sensor.

8. The photography system according to claim 1, wherein the imaging sensor generates a plurality of images by performing imaging a plurality of times, and the controller is further configured to acquire an image generated by the imaging sensor at a timing at which the position of the subject becomes a predetermined position among the plurality of images.

9. The photography system according to claim 1, wherein at least one of the plurality of sensors is a distance sensor which detects distances to the subjects and sequentially outputs the detection values.

10. The photography system according to claim 1, wherein at least one of the plurality of sensors is a light amount sensor which detects amounts of light reflected by the subjects after the light is radiated to the subjects and sequentially outputs the detection values.

11. A photography system comprising:

an observation scope inserted into a hole of a case in which a plurality of subjects, which are cyclically disposed around a rotary shaft and rotate around the rotary shaft, are housed along with the rotary shaft and the hole is formed to penetrate through the case, the observation scope being configured to sequentially acquire light from the plurality of subjects;

an imaging sensor configured to generate an image by continuously imaging light acquired by the observation scope;

a sensor configured to continuously detect states of the plurality of subjects which rotate and sequentially output detection values; and a controller configured to:

detect a position of the subject based on cyclic variation of the detection value and acquire the image including the subject at the detected position which is a predetermined position, detect a cycle in which the rotary shaft rotates based on the cyclic variation of the detection value and detects a position corresponding to a time by associating the time based on the cycle with variation of the position of the subject, detect a cycle in which the rotary shaft rotates by calculating a time in which the states of the subjects equal in number to the number of subjects disposed around the rotary shaft are detected by the sensor based on cyclic variations of the detection values, and calculate the number of subjects disposed around the rotary shaft based on an autocorrelation of a signal stream including the detection value output by the sensor in a predetermined period.

12. The photography system according to claim 11, wherein the controller is further configured to detect a cycle in which the rotary shaft rotates based on the cyclic variation of the detection value and detects a position corresponding to the detection value by associating the variation of the detection value within the cycle with variation of the position of the subject.

13. The photography system according to claim 11, wherein the sensor is an image sensor which continuously images the subject and sequentially outputs images.

14. The photography system according to claim 13, wherein the controller is further configured to detect an edge from the image output from the image sensor and detects the position of the subject based on cyclic variation of the detected edge position.

15. The photography system according to claim 13, wherein the controller is further configured to detect the position of the subject based on cyclic variations of pixel values in a plurality of pixels of an image output from the image sensor.

16. The photography system according to claim 13, wherein the controller is further configured to detect the position of the subject based on cyclic variations of a pixel value in a first pixel of the image output by the image sensor and a pixel value in a second pixel of the image output by the image sensor.

17. The photography system according to claim 11, wherein:

the sensor comprises a plurality of sensors, and the controller is further configured to detect the position of the subject based on cyclic variations of detection values output by the plurality of sensors.

18. The photography system according to claim 11, wherein the imaging sensor performs imaging at an indicated timing, and the controller is further configured to instruct the imaging sensor to perform the imaging at a timing at which the position of the subject becomes a predetermined position and acquires an image generated by the imaging sensor.

19. The photography system according to claim 11, wherein the imaging sensor generates a plurality of images by performing imaging a plurality of times, and the controller is further configured to acquire an image generated by the imaging sensor at a timing at which the position of the subject becomes a predetermined position among the plurality of images.

20. The photography system according to claim 11, wherein the sensor is a distance sensor which detects distances to the subjects and sequentially outputs the detection values.

21. The photography system according to claim 11, wherein the sensor is a light amount sensor which detects amounts of light reflected by the subjects after the light is radiated to the subjects and sequentially outputs the detection values.

* * * * *